United States Patent [19]
Takai et al.

[11] Patent Number: 5,537,377
[45] Date of Patent: Jul. 16, 1996

[54] INFORMATION RECORDING AND REPRODUCING APPARATUS

[75] Inventors: Kazuki Takai, Tokyo; Akira Takahashi, Nagoya, both of Japan

[73] Assignee: Clarion Co., Ltd., Tokyo, Japan

[21] Appl. No.: 267,973

[22] Filed: Jun. 29, 1994

[30]  Foreign Application Priority Data

Jun. 30, 1993 [JP] Japan ................................ 5-162558
Jun. 30, 1993 [JP] Japan ................................ 5-162570
Jun. 30, 1993 [JP] Japan ................................ 5-162577
Jun. 30, 1993 [JP] Japan ................................ 5-162585

[51] Int. Cl.$^6$ .......................... G11B 17/04; G11B 5/016
[52] U.S. Cl. ................. 369/77.2; 360/99.02; 360/99.06
[58] Field of Search .............................. 369/77.1, 77.2, 369/75.1, 75.2, 191, 192, 193, 264; 360/99.06, 99.07, 96.5, 98.06, 98.08, 99.02, 99.03

[56]  References Cited

U.S. PATENT DOCUMENTS

| | | | |
|---|---|---|---|
| 4,964,005 | 10/1990 | Uzuki .................................. | 360/99.06 |
| 5,123,004 | 6/1992 | Arai ..................................... | 369/77.2 |
| 5,126,899 | 6/1992 | Kanazawa ........................... | 360/99.07 |
| 5,184,342 | 2/1993 | Ishii .................................... | 369/77.2 |
| 5,224,079 | 6/1993 | Inoue ................................... | 369/77.2 |
| 5,301,176 | 4/1994 | Kawachi et al. ..................... | 369/75.2 |
| 5,309,421 | 5/1994 | Fujisawa ............................. | 369/77.1 |

*Primary Examiner*—Stuart S. Levy
*Assistant Examiner*—David L. Ometz
*Attorney, Agent, or Firm*—Koda and Androlia

[57]  ABSTRACT

An information processing apparatus such as a disk player using a disk-shaped recording medium, e.g. an MD (Mini-Disk) including a casing, a cartridge holder for holding a cartridge encasing a disk, a loading mechanism provided in the cartridge holder for loading the cartridge into the cartridge holder, a recording/reproducing unit for recording and/or reproducing information in and/or from the disk, a supporting mechanism for supporting the cartridge holder and the recording/reproducing unit in a supporting manner with respect to the casing, a supporting lock mechanism provided in the casing for locking the supporting mechanism, a power source provided on the casing for supplying driving power both to the loading mechanism and the supporting lock mechanism, a power transmission mechanism for transmitting the power from the power source to the loading mechanism and the supporting lock mechanism, and a power transmission path cut-off device for cutting off the path of power transmission from the power source to either one of the loading mechanism and the supporting lock mechanism when the supporting lock by the supporting lock mechanism is released.

13 Claims, 16 Drawing Sheets

INFORMATION RECORDING AND REPRODUCING APPARATUS

BACKGROUND OF THE INVENTION

1. Field of the Invention

The present invention relates to an information processing apparatus for performing a predetermined processing, e.g. for recording and/or reproducing information in and from a recording medium, and more particularly, to an information recording/reproducing apparatus which uses, for example, a disk-shaped recording medium encased in a cartridge. The information recording/reproducing apparatus of the present invention is used suitably but not exclusively as a vehicle-mounted disk player.

2. Prior Art

Hitherto, such information recording medium has been known as a disk-shaped medium encased in a cartridge, e.g., as an FD (Floppy Disk).

In recent years, a recording medium referred to as a MD (Mini-Disk) has become available. This type of recording medium includes an optical disk or a photo-magnetic disk encased in a cartridge. Consequently, there is an increasing demand for development of disk players which can perform recording and/or reproduction of information by using MD.

Data is compressed when recorded in an MD. In reproducing the recorded data, therefore, data read from the disk is temporarily stored in a memory and then read from the memory while being decompressed or expanded. The temporary storage of data in the memory reduces the risk of data skipping, e.g., sound skipping, even in the event of a track jump of data reading pickup during reproduction, thus improving reliability of the reproduction.

Such an MD player system, when intended for use in an automobile, requires a vibration isolating supporting structure similar to that used for an automotive CD player system. The supporting structure incorporates springs or the like means by which a data reading portion of the player is suspended from a housing of the player so that the data reading portion is isolated from vibration which otherwise may be transmitted from the housing.

Automotive disk player systems also require a loading mechanism for automatically pulling a cartridge into the player. The above-mentioned supporting structure has to be locked when the loading mechanism is operating to set the cartridge in the player, so as not to hamper the operation of the loading mechanism.

SUMMARY OF THE INVENTION

Accordingly, a primary object of the present invention is to provide an improved information recording/reproducing apparatus which satisfies the above-described requirement.

More specifically, it is an object of the present invention to provide a novel disk player of the type having a loading mechanism and/or a supporting structure, wherein the reliability of the player is improved by the use of a simple mechanism.

To this end, according to the present invention, the information processing apparatus comprises: holding means for holding a cartridge member encasing therein a recording medium on which information to be processed by the processing apparatus is stored; conveying means for conveying the cartridge member into the holding means; moving means for moving the holding means holding the cartridge to a predetermined section at which a predetermined processing is performed on the information stored in the recording medium; supporting means for resiliently supporting the predetermined section; support locking means for locking the predetermined section; lock releasing means for releasing the predetermined section from its locked state; and drive power transmitting means for transmitting driving power generated by a drive source to both the conveying means and the lock releasing means.

BRIEF DESCRIPTION OF THE DRAWINGS

The above other objects, features and advantages of the present invention will become clear from the following description of the preferred embodiment when it is read in conjunction with the accompanying drawings.

DESCRIPTION OF THE PREFERRED EMBODIMENTS

A disk player using an MD as its information recording medium will be described as an embodiment of the information recording/reproducing apparatus of the present invention.

A description will be given first of a cartridge pull-in mechanism for pulling or conveying a cartridge accommodating a recording medium into a cartridge holder of the disk player, with specific reference to FIGS. 1 to 6. This cartridge holder is placed on a turn table and, after receiving the cartridge, lowered so that the recording medium, i.e., a disk, is placed on the turn table.

Figure 1:
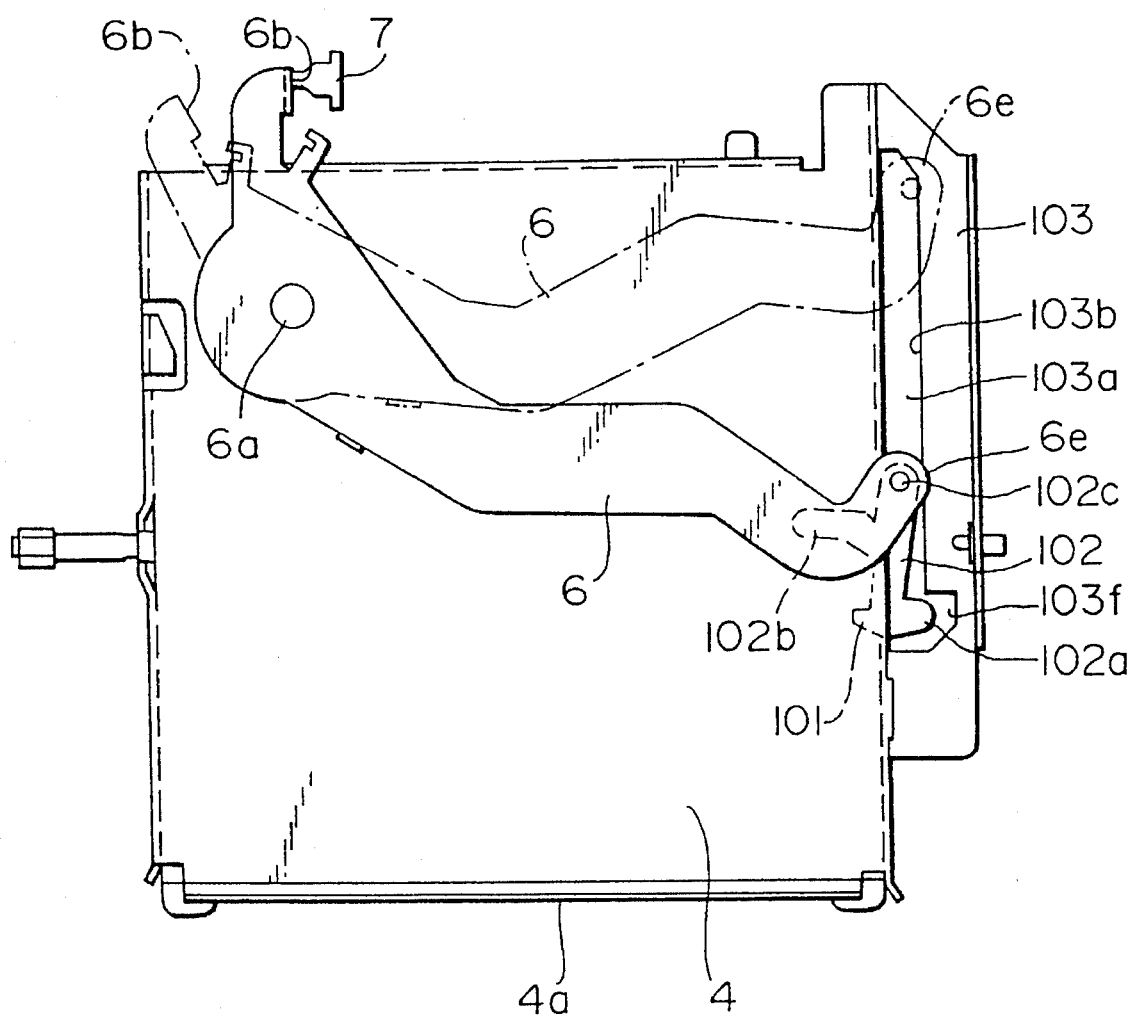
FIG. 1 is a plan view of an example of a cartridge pull-in mechanism incorporated in a disk player embodying the present invention.
Figure 2:
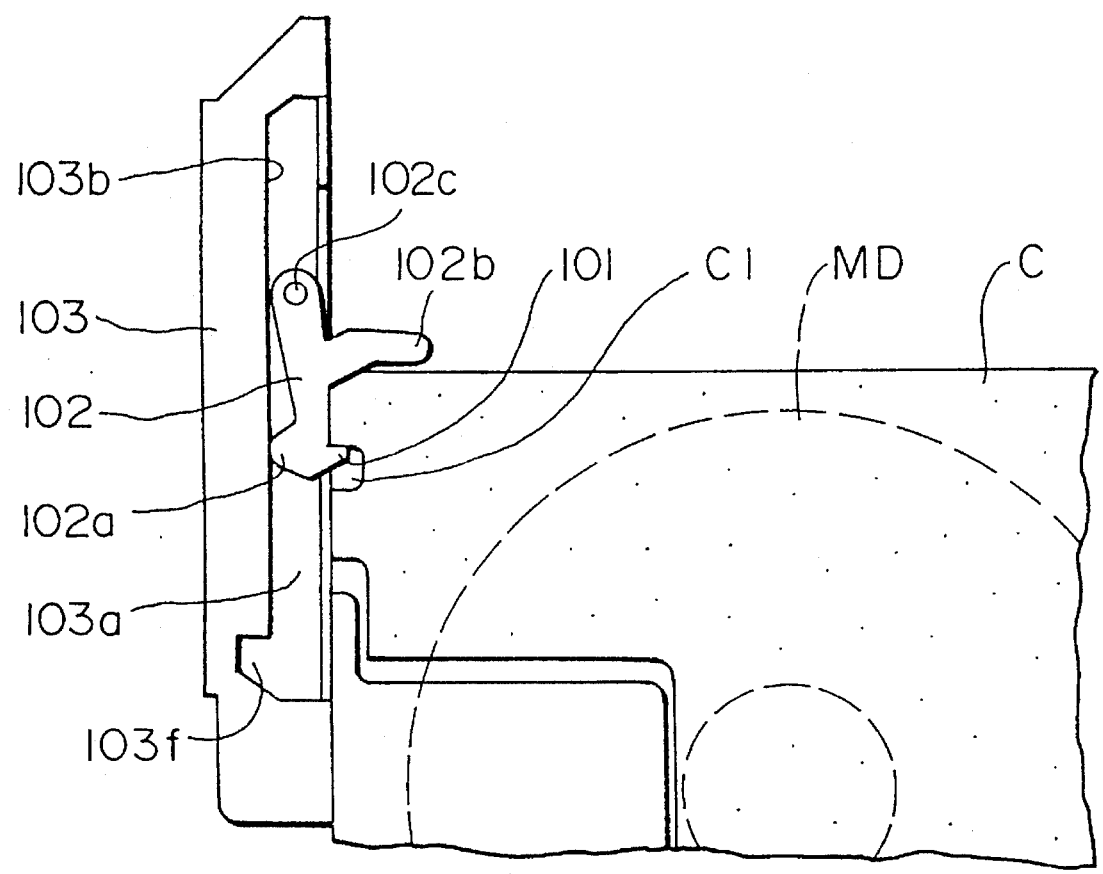
FIG. 2 is a bottom plan view of a critical portion of the mechanism shown in FIG. 1 as observed when a cartridge has been inserted in its right position.
Figure 7:
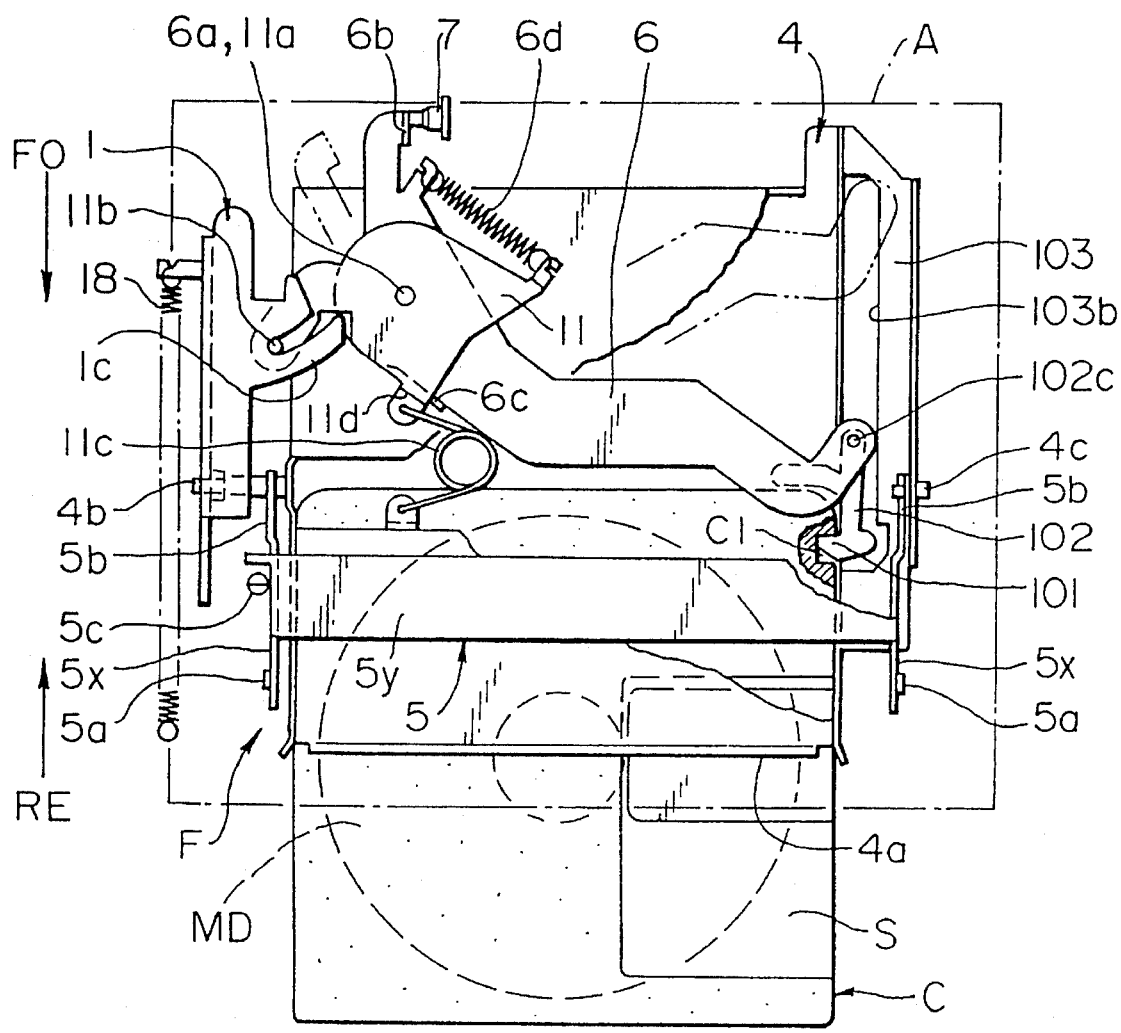
FIG. 7 is a plan view of a disk player as an embodiment of the present invention, with a cartridge holder, holder arm and other associated members partially-cut away.

FIG. 1 is a plan view of the cartridge pull-in mechanism, extracted from FIG. 7 which illustrates the whole disk player, while FIG. 2 is a bottom plan view of a critical portion of the cartridge pull-in mechanism as viewed from the rear side of FIG. 1.

This cartridge pull-in mechanism is adapted to pull a cartridge C encasing a disk, e.g., an MD disk, into a cartridge holder 4 in the MD player. As will be seen from FIG. 2, recesses C1 are formed in the lower face of the cartridge C at both side edges of the cartridge C which extend in the direction of insertion of the cartridge C. The cartridge C has a rectangular form in which the dimension of the longitudinal direction (direction of insertion) is slightly smaller than the dimension in the transverse direction (direction perpendicular to insertion direction) so that the cartridge C can be received only when it is properly inserted in the correct direction, i.e., when the cartridge C is moved in its longitudinal direction.

A cartridge insertion opening 4a is formed in the front side of the cartridge holder 4. A loading arm 6 is pivotally attached by a pivot shaft 6a to an upper inner part of the cartridge holder 4 so as to swing about the pivot shaft 6a. The proximal end of the loading arm 6 forms an engaging portion 6e, while the distal or inner end of the loading arm 6 provides a switch pressing portion 6b. The switch pressing portion 6b serves to actuate a switch 7. When the switch 7 is pressed by the switch pressing portion 6b, a drive motor which will be described later is kept out of operation, whereas when the switch 7 is separated from the switch pressing portion 6b, the driving motor is turned on to operate. When the motor operates, the power of the motor is transmitted to the loading arm 6 so as to rotate the loading arm 6 counterclockwise as viewed in FIG. 1.

A control plate 103 is fixed at positions near the side edges of the cartridge holder 4. The control plate 103 has a guide groove 103a which extends in the direction of insertion of the cartridge C. A wall of the guide groove 103a provides an abutment surface 103b. A recessed portion 103f is formed in the upstream end of the guide groove 103a as viewed in the direction of insertion.

An L-shaped clamper 102 has a pivot shaft 102c at its inner end and is pivotally secured by this pivot shaft 102c to the engaging portion 6e of the loading arm 6. The clamper 102 is disposed in a guide groove 103a of the control plate 103. The clamper 102 slides along the guide groove 103a in accordance with the pivotal motion of the loading arm 6.

A stopper 102b is formed on the inner end of the clamper 102 so as to project inward (leftward in FIG. 1 and rightward in FIG. 2) and to be contacted by the end edge of the cartridge C which is the edge of the cartridge C extending perpendicularly to the insertion direction and which is placed on the leading side of the cartridge C as viewed in the insertion direction.

The clamper 102 is normally biased counterclockwise about the pivot shaft 102c as viewed in FIG. 2 by the force of a spring which is not shown. The rotational biasing of the clamper 102 is restricted such that the stopper 102b will never be inclined beyond a position where it is parallel to the inner end edge of the cartridge C. A projection 102a is formed on the proximal end of the clamper 102 so as to project outward (rightward in FIG. 2 and leftward in FIG. 2). When the cartridge C is inserted in a wrong orientation, the clamper 102 is rotated so that the projection 102a is brought into contact with the end surface of the recessed portion 103f of the control plate 103.

An engaging claw 101 is integrally formed on the proximal end of the clamper 102. This engaging claw 101 is formed so as to project inward (leftward in FIG. 1 and rightward in FIG. 2) and to oppose the lower side of one side edge of the cartridge C, so that the claw 101 engages with one of the recesses C1 only when the cartridge C has been inserted in the correct posture.

In the cartridge pull-in mechanism having the described construction, the clamper 102 is in the most advanced position with its projection 102a positioned within the region of the recessed portion 103*f* and at the inner side (rightward in FIG. 2) of an extension of the abutment surface 103*b* of the control plate 103.

When the cartridge C is inserted in the correct posture through the cartridge insertion opening 4*a* of the cartridge holder 4, in the beginning of the travel of the cartridge C, the side face of the cartridge C pushes the engaging claw 101 outward so that the clamper 102 is rotated clockwise as viewed in FIG. 2. In this state, the projection 102*a* is positioned outside the extension of the abutment surface 103*b*. However, the clockwise rotation of the clamper 102 is never hampered because the projection 102*a* is within the region of the recessed portion 103*f* of the control plate 103.

When the cartridge C is further advanced into the player, each recess C1 of the cartridge C is engaged by the engaging claw 101, so that the clamper 102 is reset to the initial state by the force of the spring, whereby the projection 102*a* of the clamper 102 again is located on the inner side of the extension of the abutment surface 103*b*. In this state, the insertion force acting on the cartridge C is received by the stopper 102*b* so that the clamper 102 slides in the direction of insertion of the cartridge C.

As a result, the loading arm 6 is rotated counterclockwise as viewed in FIG. 1, so that the switch pressing portion 6*b* leaves the start switch 7, with the result that the motor which is not shown is started so as to cause the loading arm 6 to rotate counterclockwise as viewed in FIG. 1. Consequently, the engaging portion 6*e* is moved in the direction of insertion of the cartridge C, whereby the clamper 102 is made to slide in the same direction. Thus, while the engaging claw 101 is caught in the recess C1, the clamper 102 slides along the guide groove 103*a* in the direction of insertion of the cartridge C, whereby the cartridge C is pulled into the cartridge holder 4.

When the clamper 102 is moved in the direction of insertion of the cartridge C, the projection 102*a* of the clamper 102 is positioned in the close proximity of or in contact with the abutment surface 103*b*, so that the clamper 102 is prevented from rotating counterclockwise as viewed in FIG. 2 after the projection 102*a* is received in the guide groove 3*b*. This prevents the engaging claw 101 from being disengaged from the recess C1, so that the clamper 102 can hold the cartridge C without fail even when a mechanical load is imposed on the cartridge C.

In addition, since the clamper 102 serves as a means for pulling the cartridge C into the cartridge holder 4, the construction is simplified. This embodiment therefore is suitable for use on vehicles such as automobiles where the reduction in size and the simplification of construction are important factors.

Figure 3:
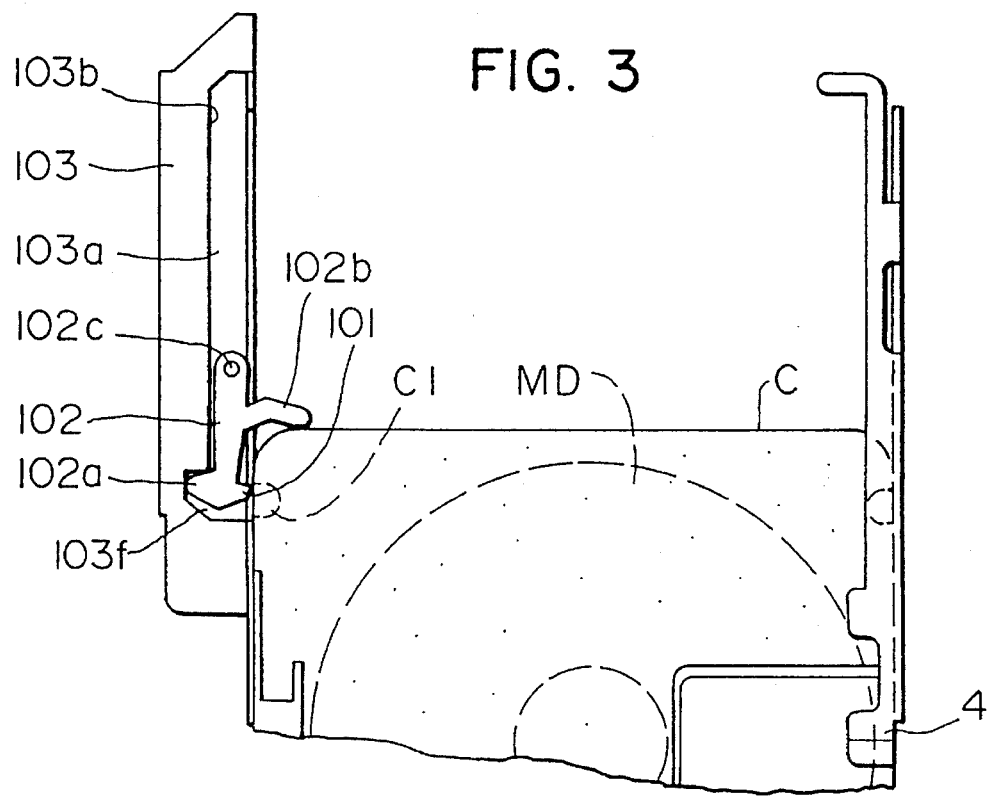
FIG. 3 is a bottom plan view similar to that shown in FIG. 2 as observed when the cartridge has been wrongly inserted with its upside downwardly facing.

FIG. 3 illustrates the case where the user wrongly tries to insert the cartridge C in a turned-over state into the cartridge holder 4. In this case, since the recess C1 of the cartridge C is positioned on the upper or obverse side of the cartridge C, the engaging claw 101 cannot engage with the recess C1. Consequently, the engaging claw 101 is forced outward by the corresponding side edge of the cartridge C so that the clamper 102 is left at the position to which it has been rotated clockwise. Thus, the projection 102*a* of the clamper 102 is disposed at the outer side of the extension of the abutment surface 103*b* of the control plate 103.

As a result, the projection 102*a* of the clamper 102 abuts the end surface of the recessed portion 103*f* of the control plate 103 so that the clamper 102 is prevented from moving in the direction of insertion of the cartridge C. Thus, the inner edge of the cartridge C is stopped by the stopper 102*b*, whereby insertion of the cartridge C in wrong posture is prevented.

Figure 4:
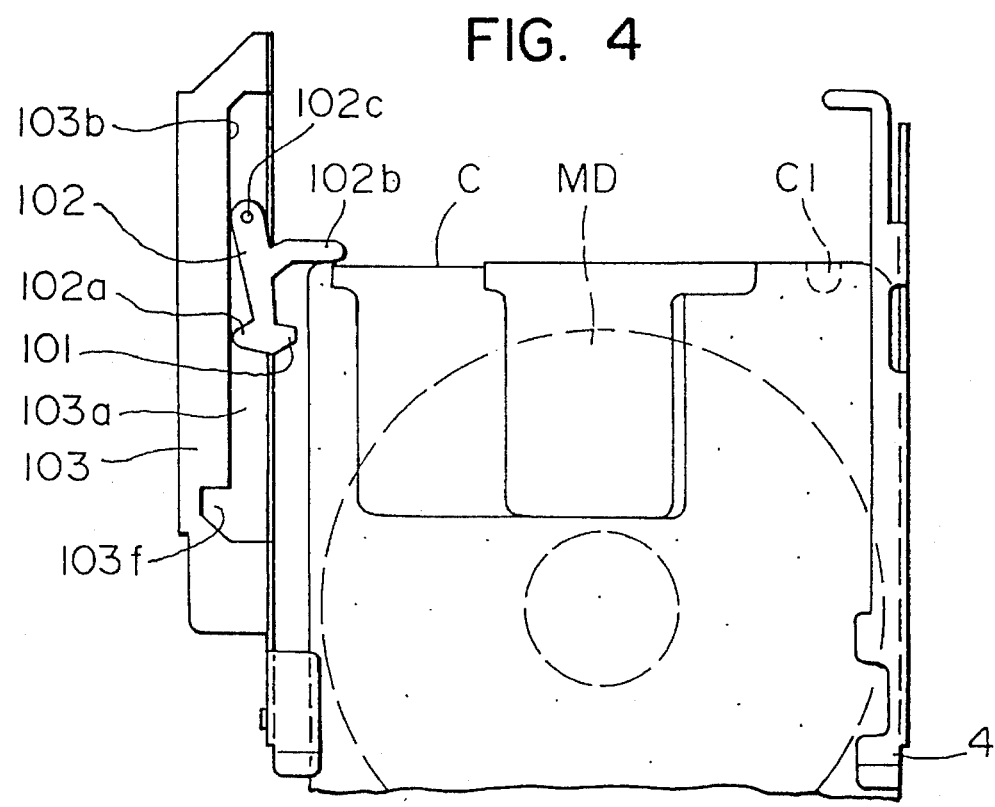
FIG. 4 is a bottom plan view similar to that shown in FIG. 2 as observed when the cartridge has been wrongly inserted with its side edge forward.

The longitudinal and transverse dimensions of an MD are different as stated before. When the cartridge C is inserted incorrectly in an orientation rotated 90° from the correct position, i.e., when the width of the cartridge C perpendicular to the insertion direction is smaller than that when the cartridge C is inserted in the correct posture, the leading or inner end edge of the cartridge C is stopped by the stopper 102*b* before the clamper 102 is rotated by the required amount of rotation. It is therefore important that the clamper 102 is pulled into the guide groove 103*a* when the projection 102*a* is not in contact with the end of the recessed portion 103*f* as shown in FIG. 4.

Moreover, the cartridge C is prevented from being wrongly inserted by the clamper caused to engage with the end of the recessed portion 103*f*. When the MD cartridge has been inserted in the wrong orientation, the above-mentioned distance is small because of the small width of the cartridge C, so that the engagement between the clamper 102 and the end of the recessed portion 103*f* may not occur.

In this case, although the clamper 102 is moved in the insertion direction in accordance with further insertion of the cartridge C, the movement of the clamper 102 cannot cause the action for pulling the cartridge C into the player because the recess C1 is not engaged with the engaging claw 101. It is therefore possible to prevent erroneous insertion of the cartridge C in the wrong orientation.

Figure 5:
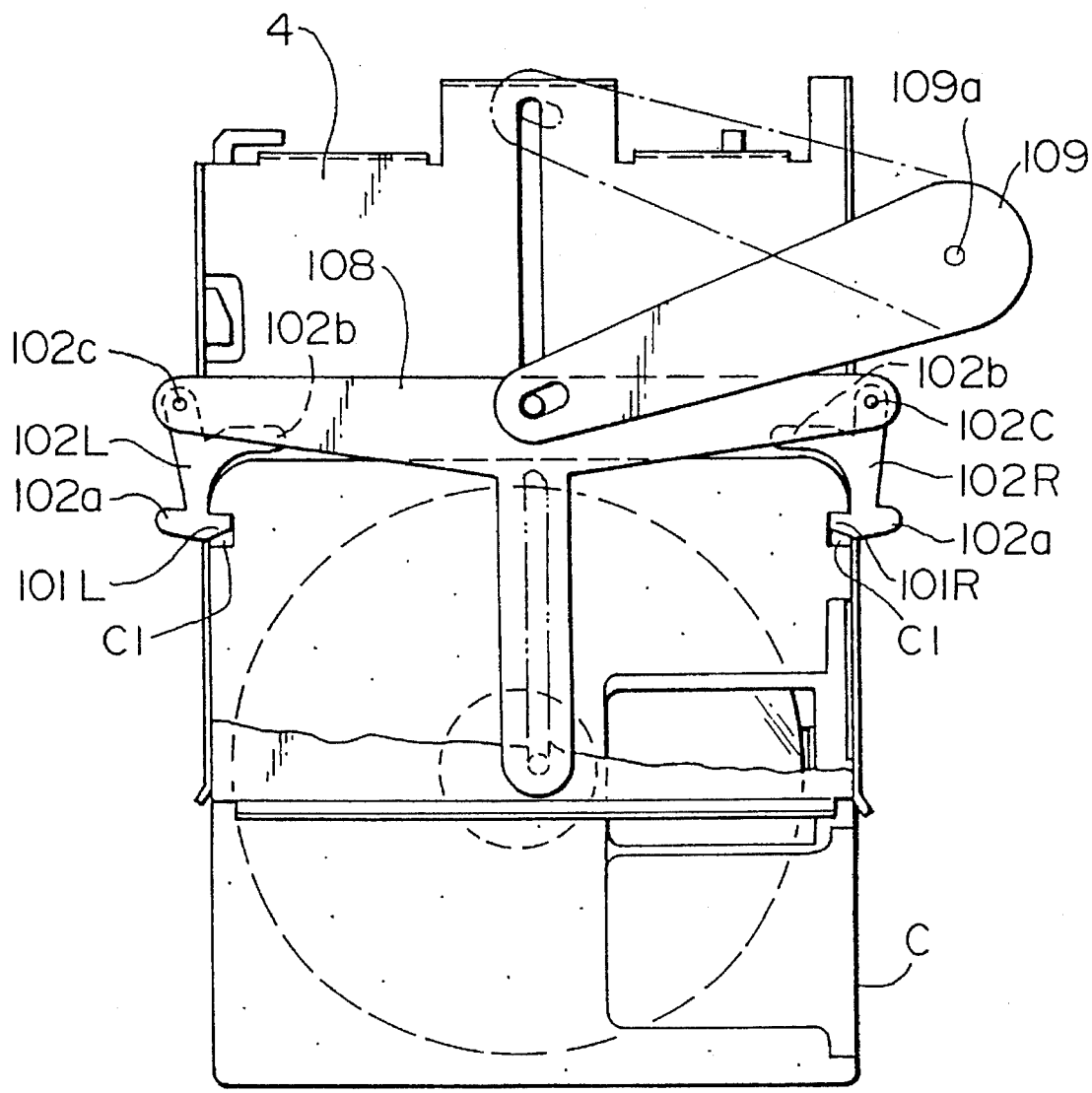
FIG. 5 is a plan view of another example of the cartridge pull-in mechanism.
Figure 6:
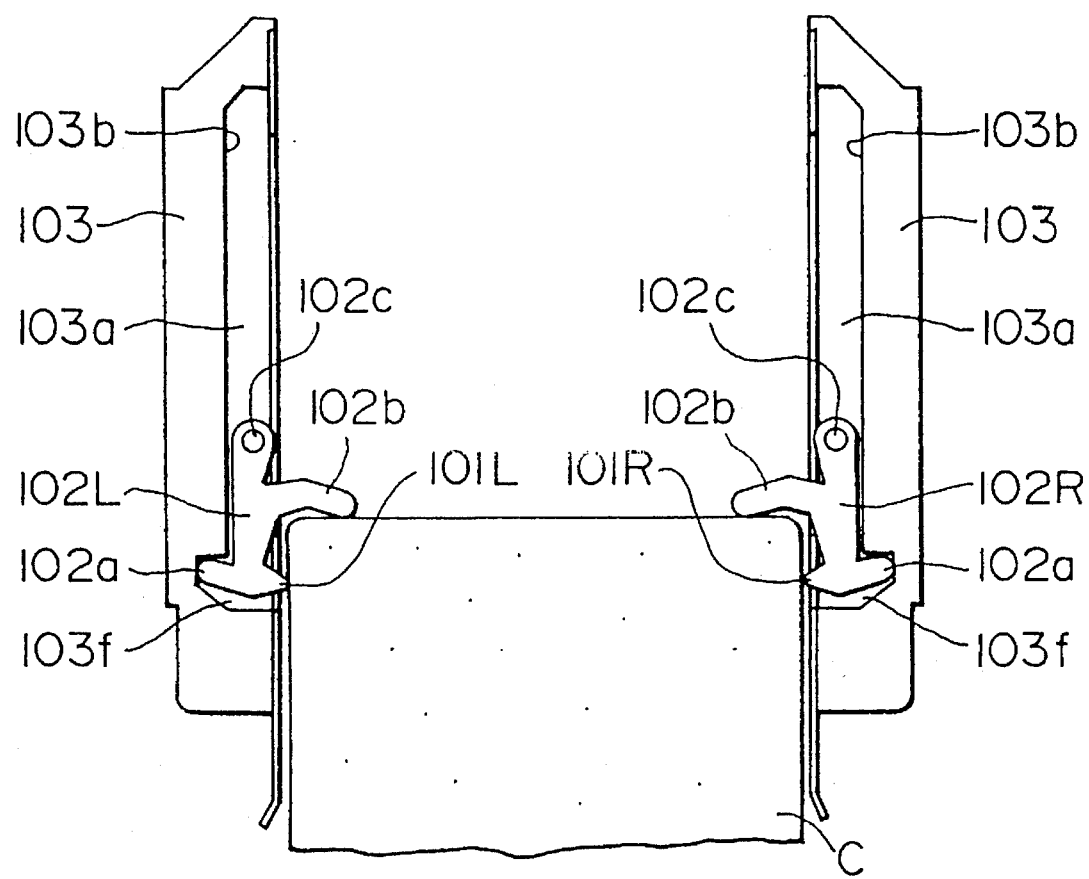
FIG. 6 is a bottom plan view of a critical portion of the mechanism shown in FIG. 5 as observed when the cartridge is wrongly inserted with its side edge forward.

Another example of the cartridge pull-in mechanism will be described with reference to FIGS. 5 and 6. In these Figures, the same reference numerals are used to denote the same parts or components as those shown in FIGS. 1 through 4.

This example of the cartridge pull-in mechanism includes a pair of clampers of the type described before, one on the left side and one on the right side of the cartridge holder 4. More specifically, a pair of clampers 102L and 102R, having engaging claws 101L and 101R, respectively engageable with a pair of recesses C1 of the cartridge C, are provided on the left and right side edges of the cartridge holder 4. The clamper 102R has the same configuration as the clamper 102 described in connection with FIGS. 1 and 2, while the clamper 102L is configured and positioned in symmetry with the clamper 102R with respect to the neutral line of the cartridge holder 4.

A substantially T-shaped catch arm 108 is attached to the upper side of the cartridge holder 4 in such a manner as to be movable in the direction of insertion of the cartridge C. The clamper 102L and the clamper 102R are pivotally carried by the left and right ends of the catch arm 108 and are urged by springs in the same manner as clamper 102 shown in FIGS. 1 and 2. Similarly to the example described before, the operations of the clampers 102L and 102R are controlled by control plates 103.

A loading arm 109 is rotatably secured to the upper surface of the cartridge holder 4 by means of a pivot shaft 109*a*. The loading arm 109 has an end which is pivotally secured to the center of the catch arm 108.

According to this cartridge pull-in mechanism, the recesses C1 formed in both side edges of the cartridge C are engaged by the engaging claws 101L and 101R, so that the cartridge C is stably and tightly held by the clampers 102L and 102R at both side edges thereof. When the loading arm 109 rotates clockwise as viewed in FIG. 5, the catch arm 108 is moved in the direction of insertion of cartridge C, followed by the movement of the clampers 102L and 102R in the same direction, whereby convey force is equally applied to both side edges of the cartridge C so as to prevent any rotation of the cartridge C while being pulled into the player.

Once the operation for pulling the cartridge C into the player is commenced, the projections 102a of the pair of clampers 102 contact the abutment surfaces 103b, so that the cartridge C is conveyed into the player stably without allowing disengagement of the clampers 102 from the cartridge C.

As explained before in connection with FIG. 4, if the cartridge C is inserted in a wrong orientation turned 90° from the correct orientation as shown in FIG. 2, the width of the cartridge C as measured in the direction perpendicular to the direction of insertion is small, so that the leading edge of the cartridge C contacts the stoppers 102b while the clampers 102L and 102R are not fully rotated. In this embodiment, however, the amount of rotation of each clamper is twice as large as that of the case where only one clamper is used. The probability of interference of at least one of the clampers 102L and 102R with the end surface of the recessed portion 103f is correspondingly high, thus enhancing the reliability of the mechanism against insertion of the cartridge C in the wrong orientation.

A description will now be given of a disk player, specifically an MD player by way of example, having the cartridge pull-in mechanism of one of the types described before with specific reference to FIGS. 7 to 29.

A. Supporting Lock Mechanism

An MD player has a chassis unit A (see FIG. 7) on which a driving unit D for reproducing data from the MD is supported in a floatable manner by a supporting lock unit F which includes a damper and a damper spring. The MD player also has a supporting lock mechanism which locks the supporting state of the supporting lock unit F including the driving unit D so as to fix the driving unit D on the chassis unit A.

The supporting lock mechanism has lockable portions D1, D2 (see FIG. 9) and D3 (see FIG. 10) which are provided on a side surface of the drive unit D and lock claws 2b and 2c engageable with these portions D1, D2 and D3. The lock claws 2b and 2c engageable with the lockable portions D1 and D2 are provided on a later-mentioned second locking guide plate 2 (see FIG. 12), while a member (not shown) having an engaging claw engageable with the portion D3 is adapted to move in synchronization with the second locking guide plate 2 in a manner known per se.

B. Cartridge Loading Mechanism

A cartridge loading mechanism for loading the MD in the disk player has a cartridge pull-in mechanism for pulling the MD into a cartridge holder 4 as explained before in connection with FIGS. 1 through 6, and a dropping mechanism for dropping the cartridge holder receiving the cartridge onto a turn table.

In this embodiment, the cartridge pull-in mechanism includes an eject link 11 and a loading arm 6 having a clamper 102.

B-1 Loading Arm

The loading arm 6 has a construction as explained before in connection with FIGS. 1 to 6 and, in addition, has an abutment portion 6c on the front end edge thereof (see FIG. 7). An arm spring 6d is secured at its one end to a portion of the loading arm 6 near the inner end thereof. The other end of the arm spring 6d is secured to the right end of the eject link 11. The arrangement is such that the abutment portion 6c is pressed onto a pressing portion 11d of the eject link 11 by the force of the arm spring 6d, so that the loading arm 6 and the eject link 11 operate in an interlocked relation to each other.

B-2 Eject Link

The eject link 11 is disposed above the loading arm 6 and is secured for horizontal pivotal motion around a pivot shaft 11a which is coaxial with the pivot shaft 6a. A connecting pin 11b projecting upward is provided on the left end of the eject link 11. A link spring 11c is fixed at its one end to the upper face of the cartridge holder 4 and at its other end to the proximal end of the eject link 11. As the eject link 11 is rotated counterclockwise slightly from the position shown in FIG. 7, the eject link 11 is urged counterclockwise as viewed in FIG. 7 by the force of the link spring 11c. A pressing portion 11d for the pressing abutment portion 6c of the loading arm 6 is formed on the proximal end of the eject link 11.

C. Members Constituting Supporting Unit

The supporting unit F includes the drive unit D, cartridge holder 4, holder arm 5, loading arm 6, eject link 11 and so forth. All these parts are kept in a supported state during the reproduction process from the MD (see FIGS. 7 to 10).

C-1 Drive Unit

The drive unit D has a turn table t which is carried by a spindle motor (not shown) and is adapted to rotate the MD accommodated in the cartridge C. The lockable portions D1 and D2 mentioned before are disposed on the left side surface of the drive unit D, while the lockable portion D3 is provided on the right side surface of the same. The drive unit D is provided at its left and right side edges with guide grooves or notches D4 and D5 which extend vertically.

The cartridge C is provided with a shutter S which is operable to expose the lower side of the disk inside the cartridge C when the disk is an optical disk (read-only disk) and both the upper and lower sides of the disk when the disk is a photo-magnetic disk capable of recording.

C-2 Cartridge Holder

The cartridge holder 4 is a member for holding the cartridge C and is disposed above the drive unit D. A cartridge insertion opening 4a is formed in the front end edge of the cartridge holder 4. The cartridge holder 4 has a claw for unlocking the shutter S of the cartridge C and a shutter spring for holding the shutter S in open position. Both the unlocking claw and the shutter spring are omitted from the drawings. When the cartridge C is received into the cartridge holder 4, the claw unlocks the shutter S, and the shutter S is moved to the open position as the cartridge C is pulled into the player. Therefore, when the cartridge C is placed onto the turn table t, the shutter S is in open position, so that the information surface of the MD faces a pickup (not shown) of the drive unit D.

An outwardly projecting holder pin 4b is provided at the center of the left side edge of the cartridge holder 4, while a guide pin 4c which also projects outward is provided on the center of the right side edge of the cartridge holder 4. These pins 4b and 4c are received in the guide grooves D4 and D5 of the drive unit D.

C-3 Holder Arm

Figure 8:
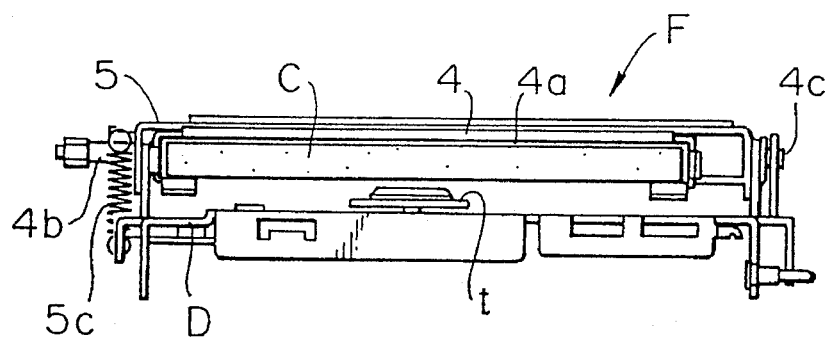
FIG. 8 is a front elevational view of a supporting unit.
Figure 9:
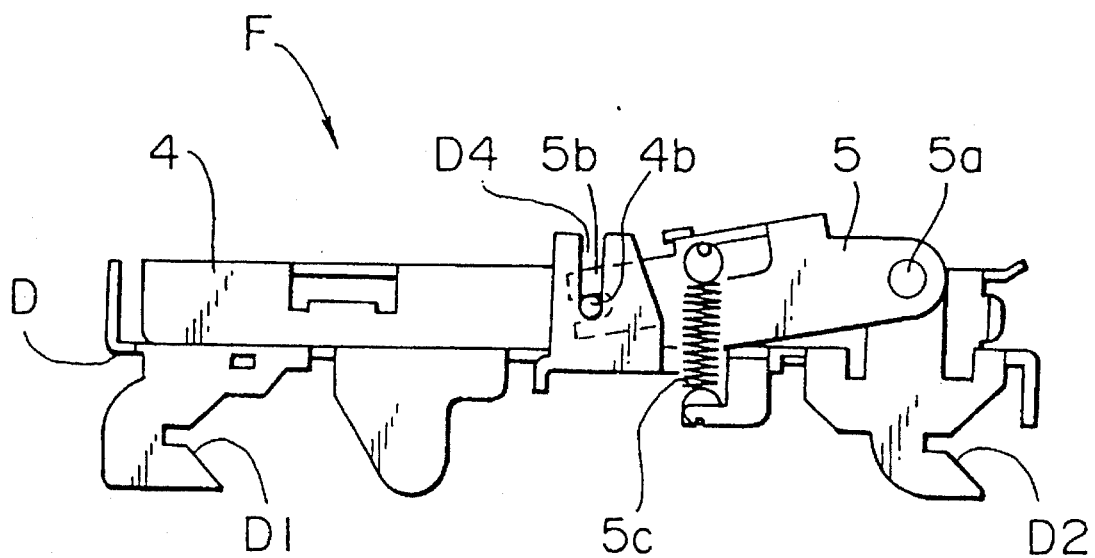
FIG. 9 is a left side elevational view of the supporting unit.
Figure 10:
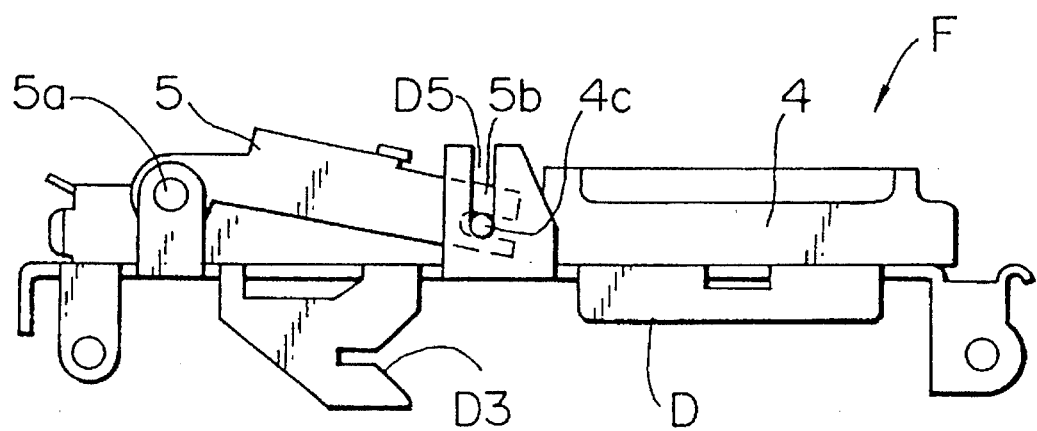
FIG. 10 is a right side elevational view of the supporting unit.

The holder arm 5 has, as shown in FIGS. 7 and 8, a pair of side plate portions 5x which extend at the left and right sides of the drive unit D and a horizontal plate portion 5y which interconnects the side plate portions 5x and is pivotable up and down about pivot shaft 5a provided on the side plate portions 5x. Gripping portions 5b for gripping the pins 4b and 4c of the cartridge holder 4 are provided on the inner ends of the holder arm 5. A holder spring 5c is secured at one end to the left side plate portion 5x of the holder arm 5, while the other end of this spring is secured to the drive unit D. The holder spring 5c urges the cartridge holder 4 downward.

A description will now be given of the construction of the loading control mechanism of this disk player. The loading control mechanism includes the first loading guide plate 1, second loading guide plate 2, timing plate 12, a driving system, and so forth.

D. First and Second Loading Guide Plates

The first loading guide plate 1 (see FIG. 11) and the second loading guide plate 2 (see FIGS. 12, 13) are provided on the left side edge of the chassis unit A so as to be slidable back and forth (directions of arrows FO and RE in FIG. 7). The first loading guide plate 1 is incorporated in the cartridge loading mechanism so as to perform loading of the cartridge, while the second loading guide plate 2 is incorporated in the supporting lock mechanism to effect a supporting lock operation. The first loading guide plate 1 and the second loading guide plate 2 are driven by the power of a drive motor 8, at operation timings controlled in a manner which will be described later.

The first loading guide plate 1 and the second loading guide plate 2 are respectively provided with a first abutment portion 1z and a second abutment portion 2z, as will be clear from FIGS. 11A to 11C and 12, and are mounted on the chassis unit A such that these abutment portions 1z and 2z oppose each other.

Figure 14:
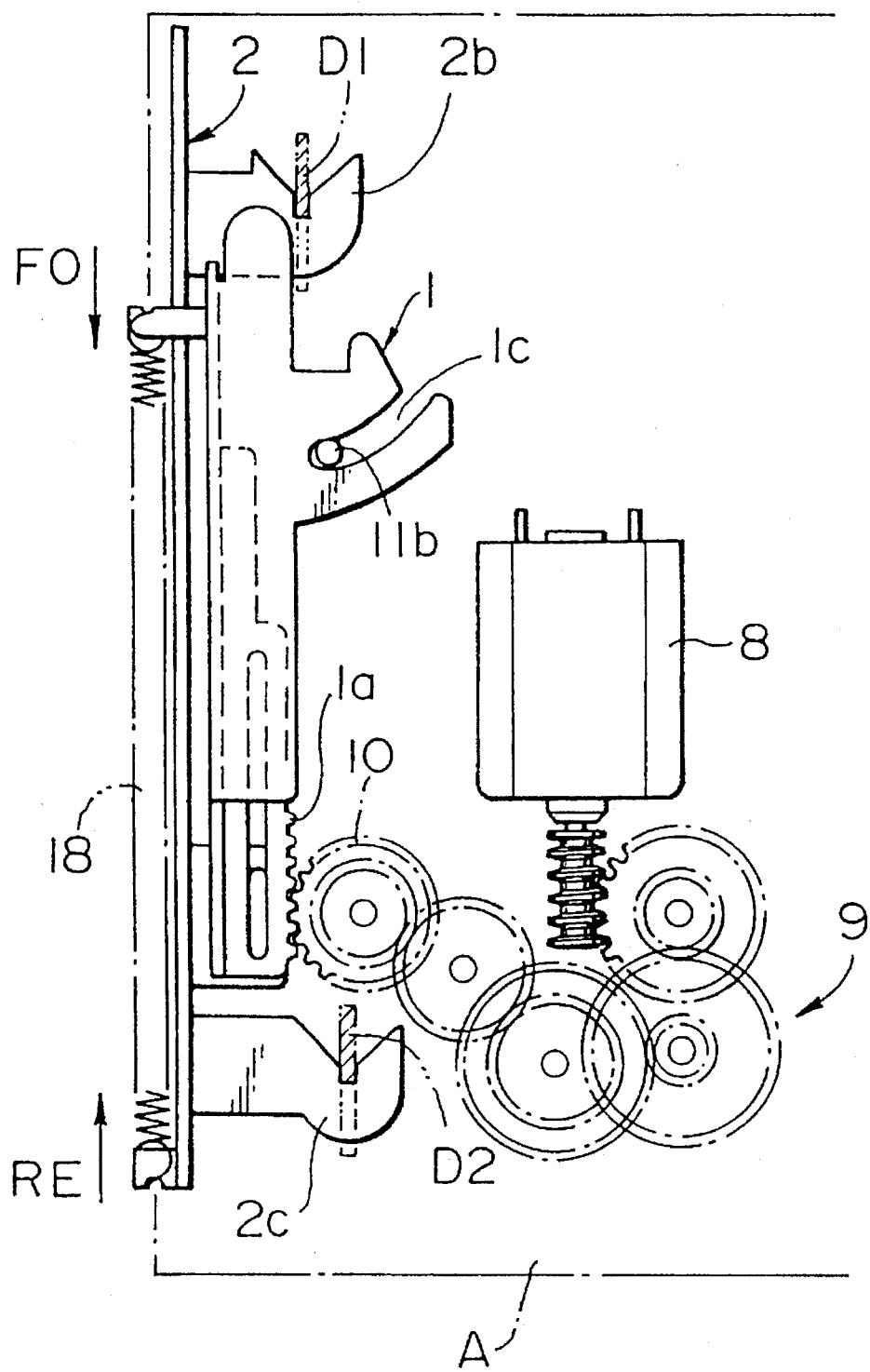
FIG. 14 is a plan view of the first and second loading guide plates, as well as of a driving system, in a state for starting a loading operation.

A connecting spring 18 which interconnects the first loading guide plate 1 and the second loading guide plate 2 is retained at its one end by a distal end portion of the first loading guide plate 1 and at its other end by a proximal end portion of the second loading guide plate 2, so as to urge the first loading guide plate 1 towards the proximal end (direction of arrow FO) and the second loading guide plate 2 towards the distal end (direction of arrow RE) as will be best seen from FIG. 14.

D-1. First Loading Guide Plate

Figure 11A:
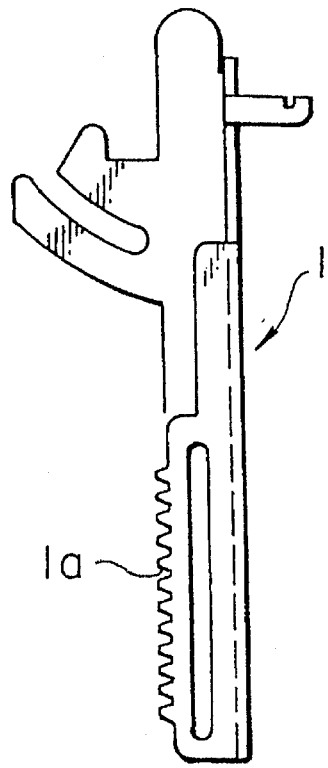
FIG. 11A is a bottom plan view of a first loading guide plate.

The first loading guide plate 1 has a bottom plate portion, a side plate portion and a top plate portion, thus exhibiting a substantially U-shaped cross-section turned sideways. A rack gear 1a is formed on the right edge of the bottom plate portion. In FIG. 11A, the rack gear 1a is illustrated on the left side edge of the first loading guide plate 1 because in this Figure the first loading guide plate 1 is viewed from the bottom side thereof.

Figure 11C:
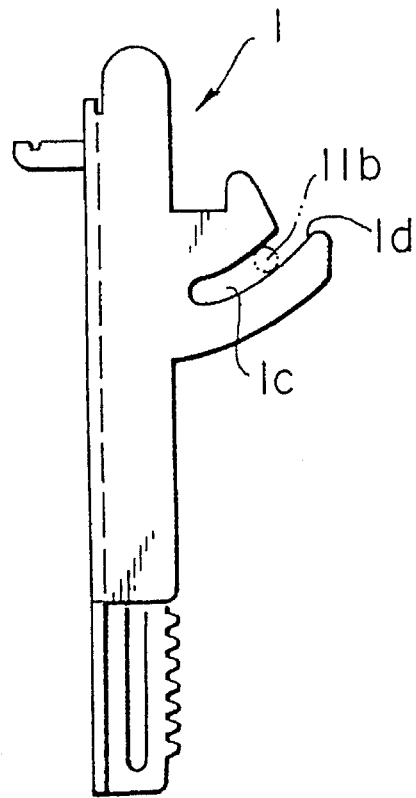
FIG. 11C is a top plan view of the first loading guide plate.
Figure 11B:
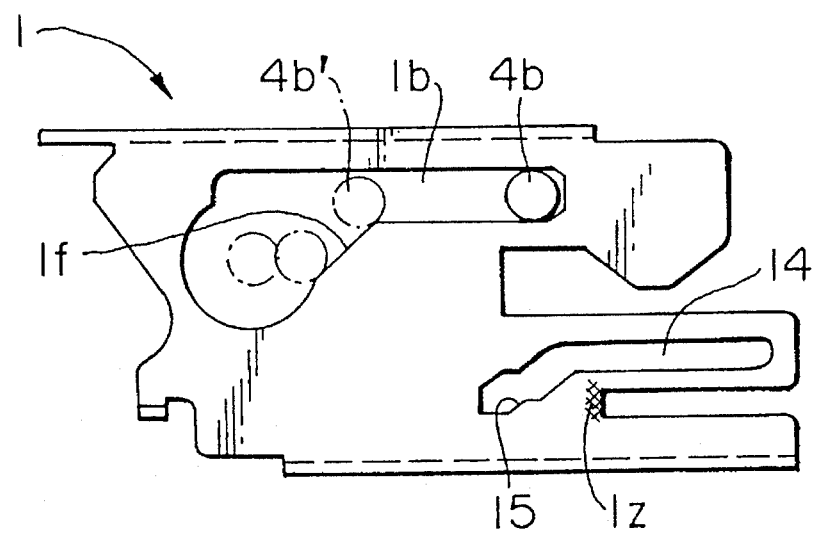
FIG. 11B is a side elevational view of the first loading guide plate.

A cam hole 1b is formed in the side plate portion of the first loading guide plate 1, as will be best seen from FIG. 11B. This cam hole 1b has a taper portion if which is tapered downward towards the distal end. The cam hole 1b receives a holder pin 4b of the cartridge holder 4 so as to control the up and downward movement of the cartridge holder 4. The first loading guide plate 1 further has a first guide groove 14 which is formed in the side plate portion along the direction of insertion (left and right directions as viewed in FIG. 11B). The first guide groove 14 merges at its end a first cam groove 15 inclined downward with respect to the groove 14.

A connecting groove 1c is formed in the top plate potion of the first loading guide plate 1, so as to rectilinearly and gently curve rightward and upward as viewed in FIG. 11C. This connecting groove 1c receives the connecting pin 11b of the eject link 11, so that the first loading guide plate 1 is connected to the eject link 11. Thus, the eject link 11 is disconnected from the first loading guide plate 1 when the connecting pin 11b comes off the connecting groove 1c. This elongated edge 1d serves as a guide for the connecting pin 11b when the latter is introduced into the connecting groove 1c.

D-2. Second Loading Guide Plate

Figure 12:
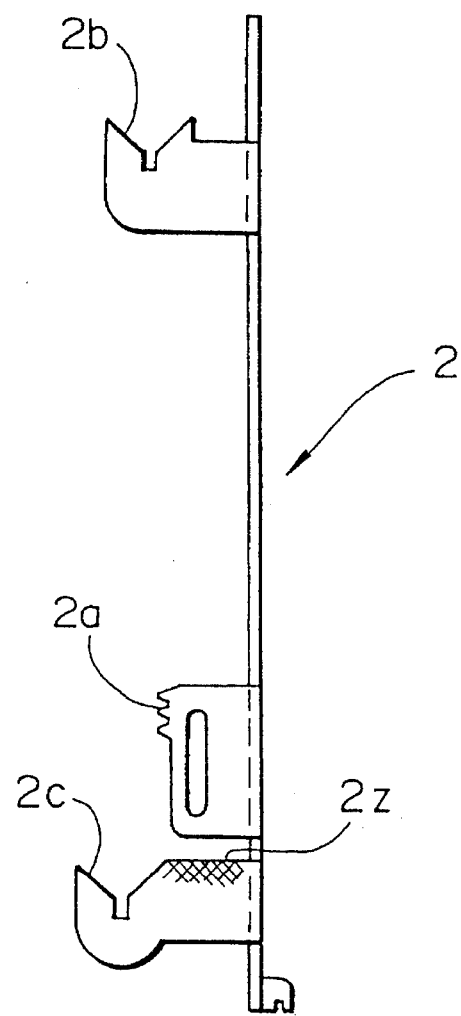
FIG. 12 is a bottom plan view of a second loading guide plate.

The second loading guide plate 2, as seen from FIG. 12, has a bottom plate portion and a side plate portion. A rack gear 2a is formed on the right side edge of the bottom plate portion. In FIG. 12, the rack gear 2a is shown on the left end edge of the second loading guide plate 2 since in this Figure the second loading guide plate 2 is seen from the bottom side thereof. A lock claw 2b and another lock claw 2c are provided on a distal end portion and a proximal end portion of the bottom plate portion of the second loading guide plate 2. As explained before, the lock claws 2b and 2c are adapted to engage with the lockable portions D1 and D2 of the drive unit D so as to lock the supporting unit F.

Figure 13:
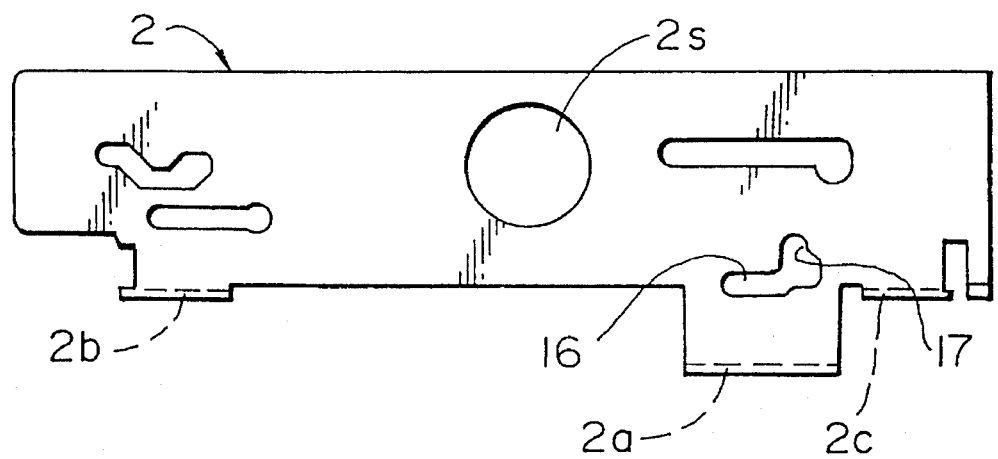
FIG. 13 is a side elevational view of the second loading guide plate.

The second loading guide plate 2 further has a substantially L-shaped second guide groove 16 as will be best seen from FIG. 13. A second cam groove 17 is connected to the second guide groove 16 so as to extend upward and towards the proximal end (rightward as viewed in FIG. 13).

E. Driving System

A driving motor 8, a gear train 9 and a loading guide gear 10 are provided on the bottom wall portion of the chassis unit A, as shown in FIG. 14.

E-1. Driving Motor and Gear train

The driving motor 8 is controlled by the start switch 7 and serves as the driving power source for driving the first loading guide plate 1 and the second loading guide plate 2. The gear train 9 transmits the driving torque from the driving motor 8 to the loading guide gear 10.

E-2. Loading Guide Gear

Figure 15A:
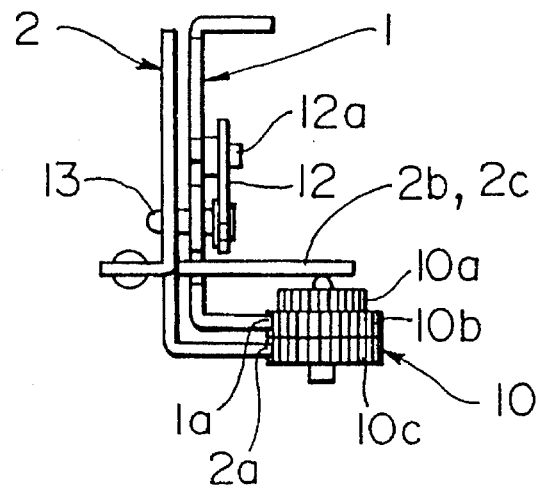
FIG. 15A is a front elevational view of a critical portion including the first and the second loading guide plates and a loading guide gear.
Figure 15B:
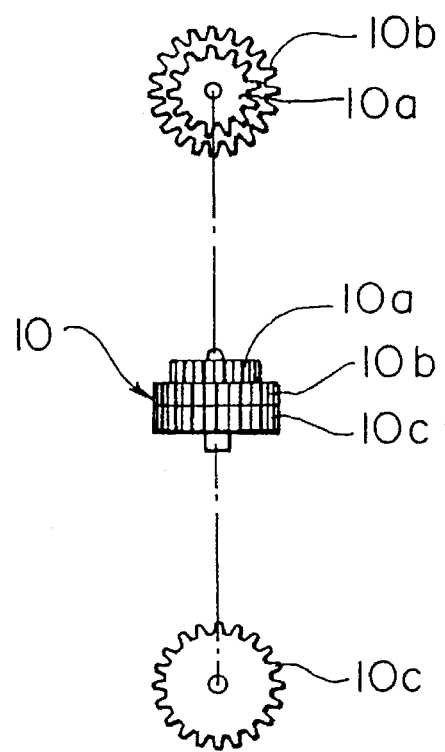
FIG. 15B shows a top, a side and a bottom view of a guide gear.

The loading guide gear 10, as seen from FIGS. 15A and 15B, is composed of a three-staged gear composed of an input gear 10a, first output gear 10b and a second output gear 10c. The input gear 10a meshes with the final gear of the gear train 9 so that the driving torque is transmitted through this input gear 10a.

As will be explained later, the first output gear 10b is in engagement with the rack gear 1a at the beginning of the loading operation as shown in FIG. 14 and terminates its engagement with the rack gear 1a at an intermediate state of the loading operation as will be seen from FIG. 17. The second output gear 10c does not engage with the rack gear 2a when the loading operation is commenced as shown in FIG. 14 but is brought into engagement therewith at an intermediate state of the loading operation as will be seen from FIG. 16.

As stated before, the first loading guide plate 1 and the second loading guide plate 2 are urged by the force of the spring in the directions of the arrow TO and RE, respectively. Therefore, when the engagements between the output gears 10b and 10c and the rack gears 1a and 2a are ceased, these rack gears 1a and 2a move away from the output gears 10b and 10c.

As will be seen from FIGS. 15A, 15B, 19 and 22, a timing plate 12 pivotable up and down about a pivot shaft 12a is disposed in the vicinity of the side plate portions of the first loading guide plate 1 and second loading guide plate 2. A timing pin 13 is attached to the end of the timing plate 12, and is received in the guide grooves 14 and 16 and, hence, in the cam grooves 15 and 17.

As will be described later, the first loading guide plate 1 and the second loading guide plate 2 operate in a predetermined sequence and timing during loading and eject operations. The timing pin 13 ensures that the operations are conducted at correct timings.

G. Timings of Operations of First Loading Guide Plate and Eject Link

The timings of engagement and disengagement between the connecting pin 11b of the eject link 11 and the connecting groove 1c of the first loading guide plate 1 are described as follows. Namely, the connecting pin 11b is disengaged from the connecting groove 1c when the first loading guide plate 1 has been moved to a position where the downward movement of the cartridge holder 4 is to be started after the cartridge has been fully pulled into the cartridge holder 4. The connecting pin 11b engages the connecting groove 1c again when the first loading guide plate 1 has been moved to a position where the upward movement of the cartridge holder 4 is completed.

The operation of the embodiment having the described construction will now be explained, both in the loading phase in which the cartridge is loaded and the ejecting phase in which the same is ejected.

(a) Loading Operation

Start of Operation of Driving Motor 8

When the cartridge C is inserted into the cartridge holder 4, one of the recesses C1 of the cartridge C is engaged by the engaging claw 101 of the clamper 102. As the cartridge C is further pushed into the player after this engagement is achieved, the loading arm 6 rotates counterclockwise as viewed in FIG. 7 against the resilient force of the arm spring 6d. At this time, the eject link 11 is prevented from moving as it is constrained by the first loading guide plate 1.

As a result, the switch pressing portion 6b of the loading arm 6 leaves the start switch 7, whereby the driving motor 8 is turned on.

Start of Sliding of First Loading Guide Plate 1

As the driving motor 8 is started, the driving power from the driving motor 8 is transmitted to the input gear 10a through the gear train 9 (see FIG. 14), so that the loading guide gear 10 starts to rotate.

Figure 22:
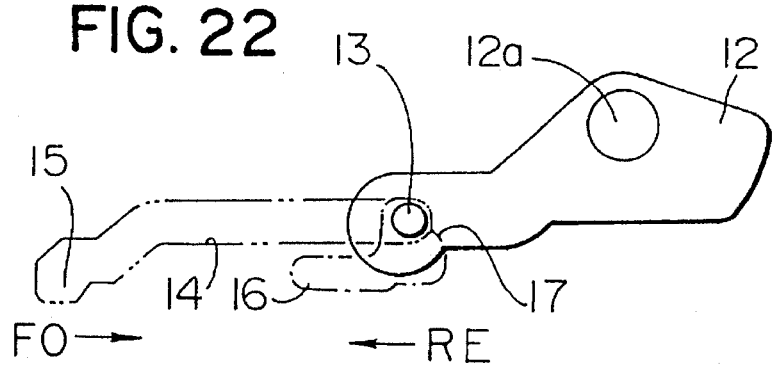
FIG. 22 is an enlarged side view of a critical portion illustrating the operations of first and second cam grooves and a timing pin shown in FIG. 19.

As described before, only the rack gear 1a of the first loading guide plate 1 is in engagement with the corresponding output gear 10b at the beginning of the loading operation (see FIGS. 14 and 19), while the rack gear 2a of the second loading guide plate 2 is still out of engagement with the associated output gear 10b, as will be seen from FIG. 22. In this state, the timing pin 13 is located at the proximal end portion of the first guide groove 14 as shown in FIG. 22. As stated before, the first loading guide plate 1 and the second loading guide plate 2 are urged by the force of the connecting spring 18 in the directions of arrows FO and RE, tending to move the first guide groove 14 and the second guide groove 16 in these directions.

Figures 16, 17, 18:
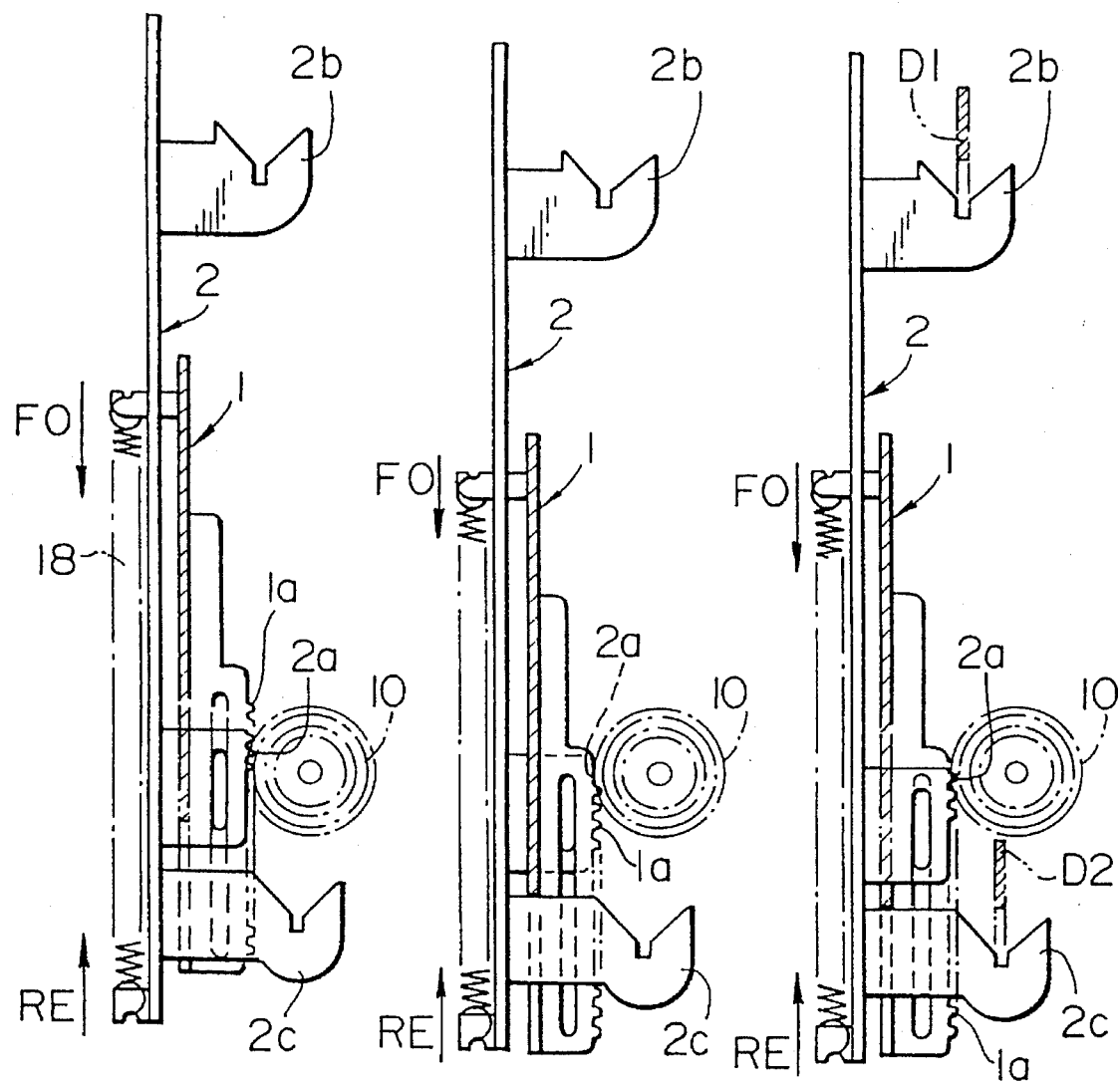
FIG. 16 is a plan view illustrating the operations of the first and second loading guide plates, at the initial stage of synchronous operation of the loading guide plates in the loading operation.
FIG. 17 is a plan view illustrating the operations of the first and second loading guide plates at the end of the synchronous operation of the loading guide plates.
FIG. 18 is a plan view illustrating the operations of the first and the second loading guide plates in a state after completion of the loading operation.
Figure 19:
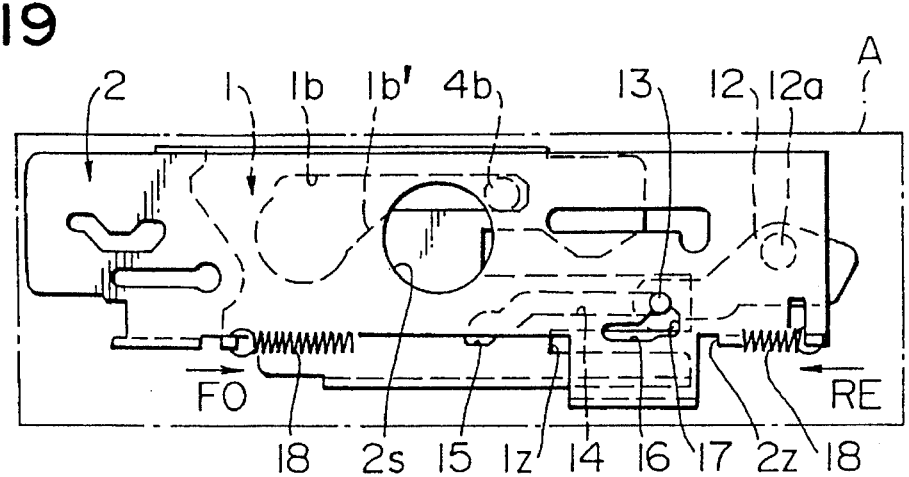
FIG. 19 is a side view illustrating the operations of the first and the second loading guide plates in a state for starting the loading operation.
Figure 20:
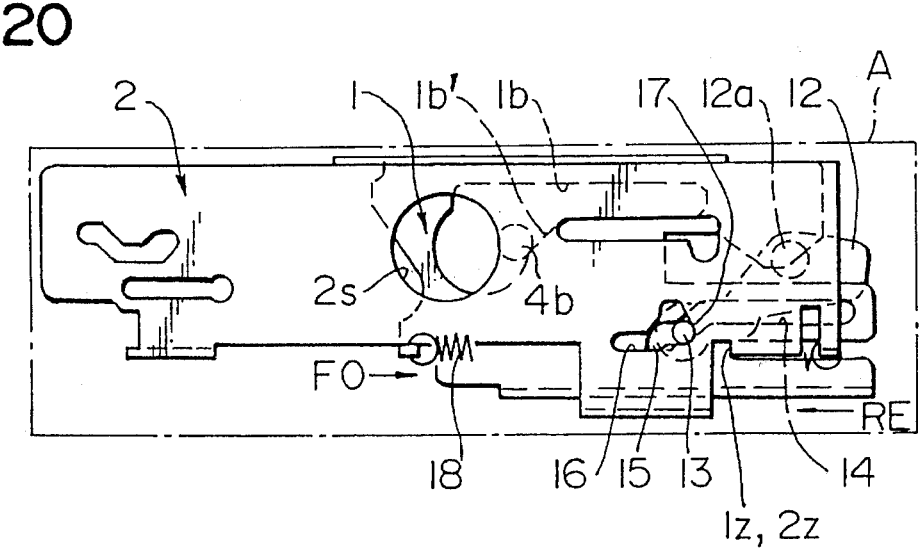
FIG. 20 is a side view illustrating the operations of the first and the second loading guide plates in the beginning of the synchronous operation of these plates in the loading operation.

As a result, the rack 1a slides by the torque of the first output gear 10b so that the first loading guide plate 1 is moved towards the proximal end (from the state shown in FIG. 14 to the state shown FIG. 16, from the state shown in FIG. 19 to the state shown in FIG. 20). Consequently, the timing pin 13 is moved along the first guide groove 14 relative thereto, from the state shown in FIG. 22 to the state shown in FIG. 23.

At this moment of the start of the loading operation, the rack gear 2a of the second loading guide plate 2 is still out of engagement with the second output gear 10c, and the second loading guide plate 2 is urged by the connecting spring 18 towards the distal end, i.e., in the direction of the arrow RE, so as to move the rack gear 2a apart from the second output gear 10c. Thus, the first loading guide plate 1 alone is moved at the beginning of the loading operation.

The rack gear 2a and the second output gear 10c are kept out of engagement by the resilient force of the connecting spring 18. However, there is a risk that the rack gear 2a may accidentally be caused to engage with the second output gear 10c due to unexpected movement of the second loading guide plate 2 caused, for example, by a vibration applied to the player. However, since the straight portion of the first guide groove 14 has a length longer than an amount of movement of the first loading guide plate 1 alone, the timing pin 13 abuts the end surface of the second cam groove 17 as long as the timing pin 13 slides in the first guide groove 14, thus preventing movement of the second loading guide plate 2 and, hence, the undesirable engagement of the rack gear 2a with the second output gear 10c.

Cartridge Pull-in Operation

Figure 27:
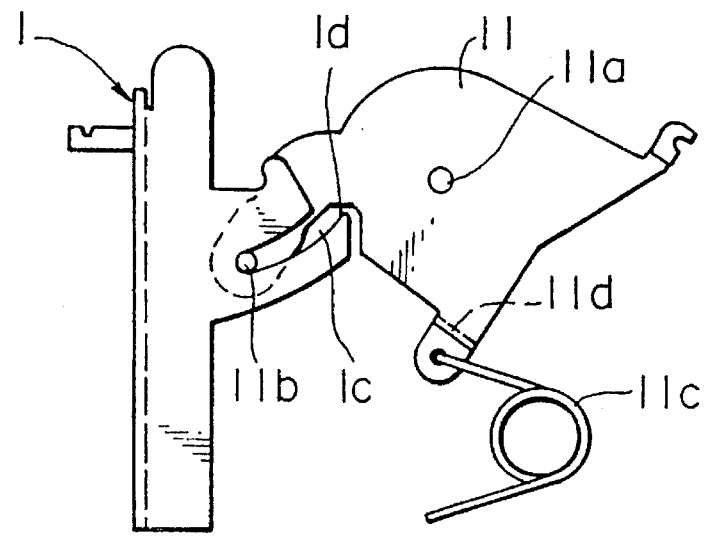
FIG. 27 is a plan view illustrating the operations of the first loading guide plate and an eject link in its position for starting the loading operation.

The cartridge holder 4 is at the raised position when the loading operation is commenced. The connecting pin 11b is in engagement with the connecting groove 1c, and the eject link 11 interconnects the first loading guide plate 1 and the loading arm 6 by the resilient force of the arm spring 6d. This state is shown in FIGS. 7, 14 and 27.

Therefore, the force by which the first loading guide plate 1 is moved appears as a force by which the pressing portion 11d presses the abutment portion 6c so as to be transmitted to the loading arm 6. Namely, the loading arm 6 is rotated counterclockwise in FIG. 7 so as to effect the pull-in operation so that the clamper 102 pulls the cartridge C into the cartridge holder 4 while keeping engagement with the recess C1 of the cartridge C.

Figure 28:
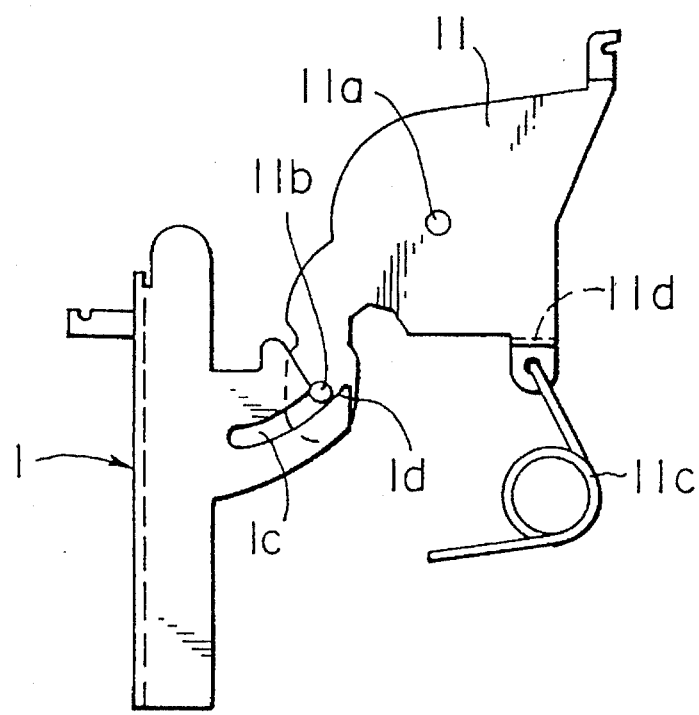
FIG. 28 is a plan view illustrating the operations of the first loading guide plate and the eject link in an intermediate step of the loading operation.

As will be explained later, the first loading guide plate 1 continues to further move even after the operation for pulling the cartridge C into the cartridge holder 4 is completed, so that the connecting pin 11b is disengaged from the connecting groove 1c as shown in FIG. 28. Thus, the eject link 11 which is held on the cartridge holder 4 is disconnected from the first loading guide plate 1 carried by the chassis unit A, whereby the cartridge holder 4 is freed to become floatable.

Start of Sliding of Second Loading Guide Plate 2

Figure 23:
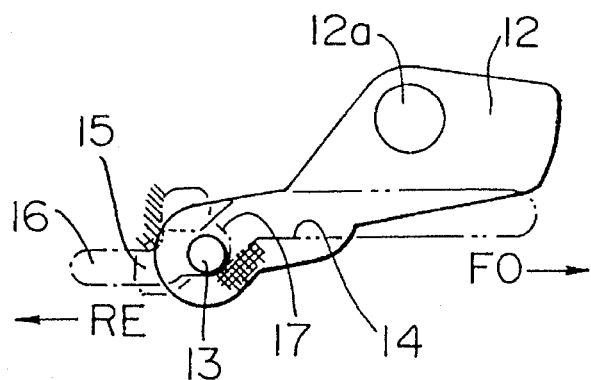
FIG. 23 is an enlarged side elevational view of a critical portion illustrating the operations of the first and second cam grooves and a timing pin shown in FIG. 20 at the beginning of the synchronous operation of two loading guide plates in the loading operation.

Referring to FIG. 23, the timing pin 13 is relatively moved along the straight portion of the first guide groove 14 into the first cam groove 15 as a result of movement of the first loading guide plate 1, so that the cam groove 15 pushes the timing pin 13, with the result that the timing plate 12 is rotated about the pivot shaft 12a counterclockwise as viewed in FIG. 23. Consequently, the timing pin 13 is disengaged from the right end of the second cam groove 17, and the second loading guide plate 2 is freed from the timing pin 13.

At this moment, the first abutment portion 1z of the first loading guide plate 1 is brought into contact with the second abutment portion 2z of the second loading guide plate 2 so as to press the second loading guide plate 2 in the direction of the arrow FO against the force of the connecting spring 18 as shown in FIG. 20. Consequently, the rack 2a of the second loading guide plate 2 is brought into engagement with the second output gear 10c.

Therefore, as the loading guide gear 10 is rotated, the second output gear 10c drives the rack 2a so that the second loading guide plate 2 starts to move towards the proximal end (see FIGS. 23 to 25) in synchronization with the first loading guide plate 1. Meanwhile, the timing pin 13 moves along the first cam groove 15.

Operation for Dropping Cartridge

When the holder pin 4b of the cartridge holder 4 reaches the downward tapered portion of the cam hole 1b (see FIG. 20) as a result of the movement of the first loading guide plate 1, the gripping portion 5b of the holder arm 5 presses down the holder pin 4b and the guide pin 4c by the resilient force of the holder spring 5c, so that the holder pin 4b slides down along the cam hole 1b. As a result, the cartridge holder 4 is lowered while the pins 4b and 4c are guided by the guide grooves D4 and D5 so that the cartridge C together with the cartridge holder 4 is lowered onto the drive unit D.

Then, a magnet (not shown) provided on the turn table t attracts a magnetic portion (not shown) provided at the center of the MD, whereby the disk is held on the turn table t.

Stop of Sliding of First Loading Guide Plate 1

Figure 25:
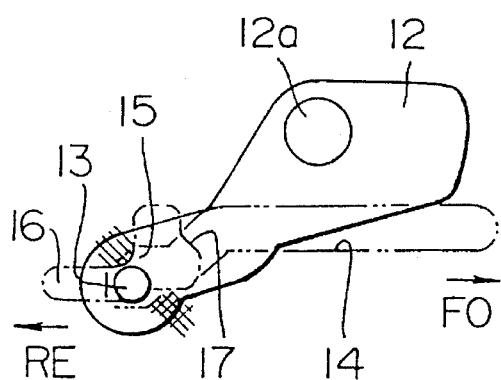
FIGS. 24 and 25 are enlarged side views illustrating the operations of the first and second cam grooves and the timing pin in its two intermediate positions between its two extreme positions shown in FIG. 23 and FIG. 26.
Figure 24:
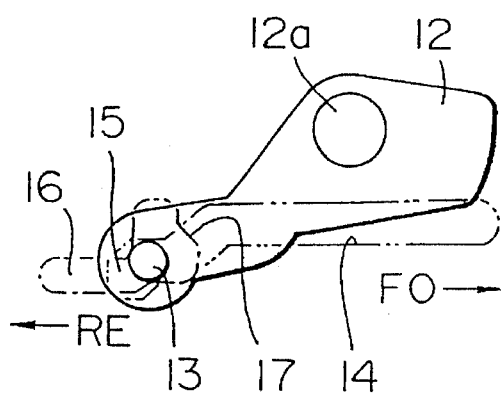

When the dropping of the cartridge is finished as described above, there is no tooth on the rack 1a which would mesh with the first output gear 10b, so that the sliding movement of the first loading guide plate 1 is ceased (see FIGS. 17 and 25). Consequently, the synchronous movement of the first loading guide plate 1 and the second loading guide plate 2 also is ceased, so that the second loading guide plate 2 alone is moved thereafter.

At the same time, due to disengagement of the rack gear 1a from the first output gear 10b, the first loading guide plate 1 is slightly moved in the direction of the arrow FO due to the resilient force of the connecting spring 18, whereby the rack gear 1a is completely isolated from the first output gear 10b.

Thus, the rack gear 1a is spaced apart from the first output gear 10b after the completion of movement of the first loading guide plate 1, because it is necessary to delay the operation of the first loading guide plate 1 after the operation of the second loading guide plate 2 in the eject operation as will be described later. Namely, there is a risk that the first loading guide plate 1 will operate too early in the eject operation, unless the rack gear 1a is intentionally spaced from the first output gear 10b in this state.

Even though the arrangement is such that the rack gear 1a is spaced apart from the first output gear 10b by the resilient force of the connecting spring 18, there still is a risk that a large load is applied for any unexpected reason on the rack gear 1a, i.e., on the first loading guide plate 1 so as to prevent the rack gear 1a from being spaced apart from the first output gear 10b by the force of the connecting spring 18 alone.

In order to eliminate the risk stated above, the described embodiment employs the following construction. Referring to FIG. 25, when the movement of the first loading guide plate 1 has been completed (when the timing pin 13 has been positioned at the end of the first cam groove 15), the hatched portion of the second guide groove 16 pushes the double-hatched portion of the first cam groove 15 in the direction of the arrow FO through the timing pin 13 so that the rack gear 1a is forcibly spaced apart from the first output gear 10b even when this could not be done by the force of the connecting spring 18 alone. Even if the sliding motion of the first loading guide plate 1 encounters a large resistance, the spaced apart relation can be maintained by the force of the connecting spring 18 once the rack gear 1a is successfully spaced apart from the first output gear 10b.

Unlocking of Supporting Lock Mechanism

Figure 21:
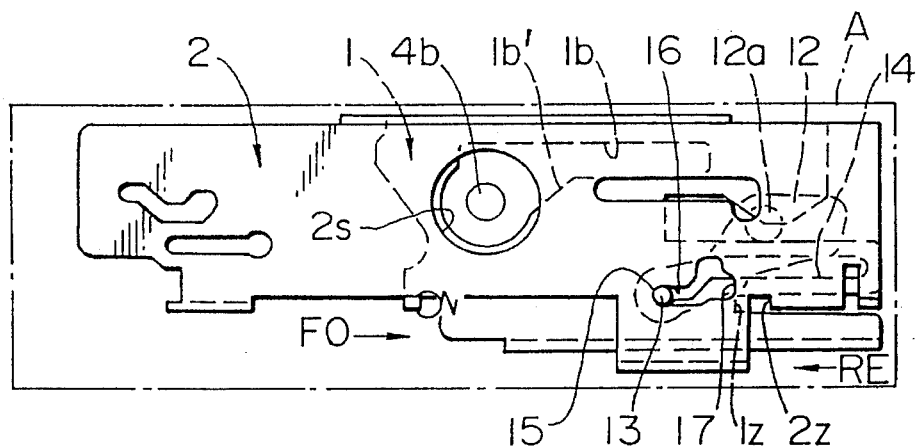
FIG. 21 is a side view illustrating the operations of the first and the second loading guide plates in a state after completion of the loading operation.

Finally, the lock claws 2b and 2c are moved apart from the lockable portions D1 and D2 of the drive unit D as a result of movement of the second loading guide plate 2, as will be seen from FIGS. 18 and 21. Consequently, the locking effect of the supporting lock mechanism is released, so that the supporting unit F is allowed to resiliently support the drive unit D. In this supported condition, a hole 2s formed in the second loading guide plate 2 is aligned with a circular portion of the cam hole 1b, and the holder pin 4b is positioned at the center of the hole 2s as shown in FIG. 21 so that the holder pin 4b can be moved within the hole 2s so that the cartridge holder 4 can be resiliently supported.

Termination of Sliding of Second Loading Guide Plate 2

Figure 26:
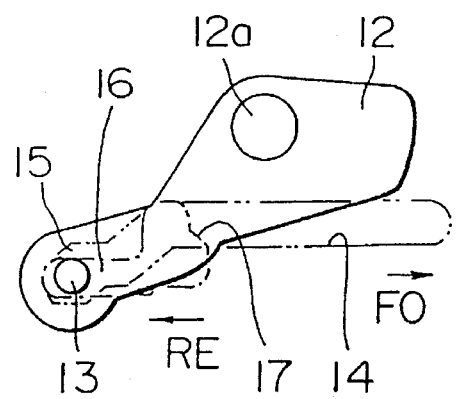
FIG. 26 is an enlarged side elevational view illustrating the first and second cam grooves and the timing pin shown in FIG. 21 in its position after the completion of the loading operation.

After completion of the unlocking operation described above, when arrival of the second loading guide plate 2 at the final position is detected by a sensor or a switch, the driving motor 8 is stopped so that the sliding motion of the second loading guide plate 2 is ceased while keeping the rack gear 2a in engagement with the second output gear 10c, as shown in FIG. 18. In this state, the timing pin 13 is located at the distal ends of the first cam groove 15 and the second guide groove 16, as shown in FIG. 26.

(b) Ejecting (Unloading) Operation

A description will now be given for the operation for ejecting the MD from the disk player.

Start of Sliding of Second Loading Guide Plate and Locking Operation of Supporting Lock Mechanism In response to a predetermined instruction for triggering the ejecting operation, the driving motor 8 operate in the direction opposite to that described above, so that the loading guide gear 10 is rotated in the direction reverse to that in the loading operation. At this moment of the start of the eject operation, i.e., when the MD is still in the loaded condition, engagement is taking place only between the rack gear 2a of the second loading guide plate 2 and the second output gear 10c as described before. Namely, the rack gear 1a of the first loading guide plate 1 is still out of engagement with the first output gear 10b. In addition, a force tending to space the rack gear 1a from the first output gear 10b is exerted by the connecting spring 18.

The rack 2a is moved due to the torque of the second output gear 10c, so that the second loading guide plate 2 alone is moved towards the distal end (direction of arrow RE), from the position shown in FIG. 18 to the position shown in FIG. 17 and from the position shown in FIG. 21 to the position shown in FIG. 20. Consequently, the timing pin 13 is caused to slide along the second guide groove 16 relative thereto, from the position shown in FIG. 26 to the position shown in FIG. 25.

As a result of this movement of the second loading guide plate 2, the lock claws 2b, second guide groove 16 are brought into engagement with the lockable portions D1 and D2 of the drive unit D.

As described before, the rack gear 1a is prevented from engaging with the first output gear 10b by the force of the connecting spring 18. However, there is a risk that the rack gear 1a may accidentally be brought into engagement with the first output gear 10b due to an unexpected motion of the first loading guide plate 1 caused by, for example, vibration applied to the player. In this embodiment, however, since the straight portion of the second guide groove 16 has a length corresponding to the period in which the second loading guide plate 2 alone moves, the double-hatched portion of the first cam groove 15 (see FIG. 25) is contacted by the timing pin 13 as long as the timing pin 13 is sliding along the second guide groove 16, so that the first loading guide plate 1 is prevented from moving, thus avoiding undesirable engagement between the rack gear 1a and the first output gear 10b.

Start of Sliding of First Loading Guide Plate

Referring to FIG. 25, when the timing pin 13 has reached the second cam groove 17 as a result of movement of the second loading guide plate 2, the second cam groove 17 presses the timing pin 13 so that the timing plate 12 is rotated counterclockwise as viewed in FIG. 12 about the pivot shaft 12a. Consequently, the timing pin 13 is moved apart from the double-hatched region of the first cam groove 15 so that the first loading guide plate 1 is freed from the timing pin 13.

At this moment, the second abutment portion 2z of the second loading guide plate 2 is brought into contact with the first abutment portion 1z of the first loading guide plate 1 so as to press the latter in the direction of the arrow RE against the force of the connecting spring 18 so that the rack gear 1a of the first loading guide plate 1 starts to engage with the first output gear 10b.

Then, further rotation of the loading guide gear 10 causes the rack 1a to slide by the power from the first output gear 10b, so that the first loading guide plate 1 is moved toward the distal end (direction of the arrow RE) in synchronization with the second loading guide plate 2, from the state shown in FIG. 25 to that shown in FIG. 23. Meanwhile, the timing pin 13 moves along the first cam groove 15.

Cartridge Lifting Operation

Then, the first loading guide plate 1 is moved to a position where the holder pin 4b is movable in the cam hole 1b, so that the holder pin 4b is allowed to rise in accordance with the contour of the cam hole 1b, from the state shown in FIG. 20 to the state shown in FIG. 19. Consequently, the cartridge holder 4 is raised with the pins 4b and 4c thereof being guided by the guide grooves D4 and D5.

Termination of Sliding of Second Leading Guide Plate 2

When the locking of the floatable portion is finished by the operation of the second loading guide plate 2, there is no tooth of the rack gear 2a to be engaged by the second output gear 10c, so that the sliding of the second loading guide plate 2 is terminated, as will be seen from FIGS. 16 and 23. Consequently, the synchronization between the first loading guide plate 1 and the second loading guide plate 2 is ceased, so that the first loading guide plate 1 alone continues to move thereafter.

The disengagement between the first output gear 10b and the rack gear 1a causes the second loading guide plate 2 to be slightly moved in the direction of the arrow RE due to the force of the connecting spring 18 so that the rack gear 1a is completely spaced apart from the first output gear 10b.

Thus, the rack gear 2a is positively spaced away from the second output gear 10c after completion of the movement of the second loading guide plate 2, because the start of operation of the second loading guide plate 2 should be slightly delayed from the start of operation of the first loading guide plate 1 when the next loading operation begins. Namely, the second loading guide plate 2 may start to operate too early in the next loading operation unless the rack gear 2a is positively spaced away from the second output gear 10c.

As explained before in connection with the loading operation, although the arrangement is such that the rack gear 2a is spaced apart from the second output gear 10c by the force of the connecting spring 18, there still is a risk that the rack gear 2a cannot be spaced by the force of the connecting spring 18 alone as a result of application of a large load on the rack gear 2a, i.e., on the second loading guide plate 2.

This risk is obviated in the described embodiment as follows. Referring to FIG. 23, when the movement of the second loading guide plate 2 has been finished, i.e., when the timing pin 13 has been brought to the end of the second cam groove 17, the double-hatched area of the first cam groove 15 shown in this Figure presses the hatched region of the second guide groove 16 in the direction of the arrow RE through the timing pin 13, so that the rack gear 2a is forcibly spaced apart from the second output gear 10c even when such spacing could not be effected by the force of the connecting spring 18 alone. Once the rack gear 2a is freed from the second output gear 10c, the spaced relation can be maintained by the force of the connecting spring 18, even if the sliding of the second loading guide plate 2 encounters a large sliding resistance.

After completion of the described operation, the timing pin 13 is moved from the second guide groove 16 into the straight portion of the first guide groove 14, so that the timing pin 13 faces the hatched region of the second guide groove 16 shown in FIG. 23 so that further movement of the second loading guide plate 2 is prevented.

The rise of the cartridge holder 4 has been almost completed when the lock of the floatable part is finished.

Operation for the Ejecting Cartridge C

When the first loading guide plate 1 has been moved to a position where the upward movement of the cartridge holder 4 is completed, the connecting pin 11b of the eject link 11 is brought into contact with the end 1d from the distal end side to establish the state shown in FIG. 28. A further movement of the first loading guide plate 1b towards the distal end causes the connecting pin 11b to be moved towards the distal end of the connecting groove 1c due to rotation of the eject link 11, so that the first loading guide plate 1 and the loading arm 6 are coupled to each other through the eject link 11.

As a result, the moving force acting on the first loading guide plate 1 is transmitted to the loading arm 6 via the eject link 11 and the arm spring 6d, whereby the eject operation by the loading arm 6 is executed by the force transmitted from the first loading guide plate 1. Namely, the loading arm 6 rotates clockwise as viewed in FIG. 7 so as to perform the ejecting operation so that the rear end of the cartridge C is exposed to the exterior of the cartridge holder 4 while the recess C1 of the cartridge C is still engaged with the clamper 102.

Termination of Sliding of First Loading Guide Plate 1

As a result of the clockwise swing of the loading arm 6 in FIG. 7, the switch pressing portion 6b of the loading arm 6 presses the start switch 7 so as to turn the driving motor 8 off so that the eject operation is completed. As a result of the stopping of the driving motor 8, the sliding of the first loading guide plate 1 ceases while keeping the rack gear 1a engaged with the first output gear 10b, thus realizing the state shown in FIG. 14.

The cartridge C which is partly exposed from the cartridge insertion opening 4a can be manually pulled, so that the clamper 102 is rotated against a clamper biasing spring (not shown) so as to disengage the engaging claw 101 from the recess C1 so that the cartridge C can be taken out of the disk player.

In the disk player described hereinbefore, the power transmitting mechanism for transmitting power from the driving power source on the chassis unit A to the loading arm 6 on the supporting unit F can be switched between transmitting state and non-transmitting state at predetermined timings, so that both the loading mechanism provided on the chassis unit A and the supporting locking mechanism on the floatable part can be operated by a common power source, whereby the construction of the disk player is simplified.

In addition, the racks 1a and 1b provided on the first loading guide plate 1 and second loading guide plate 2 are adapted to engage with the loading guide gear 10 at different timings. This eliminates the necessity for a large rack which would control both the first loading guide plate 1 and the second loading guide plate 2, thus contributing to reduction in the size of the player.

Furthermore, the reliability of the disk player is enhanced by virtue of the fact that the operation timings of the first loading guide plate 1 and the second loading guide plate 2 are stably regulated owing to the timing plate 12 having a timing pin 13 which is received in the first guide groove 14 and the second guide groove 16 respectively formed in the first loading guide plate 1 and the second loading guide plate 2.

Figure 29A:
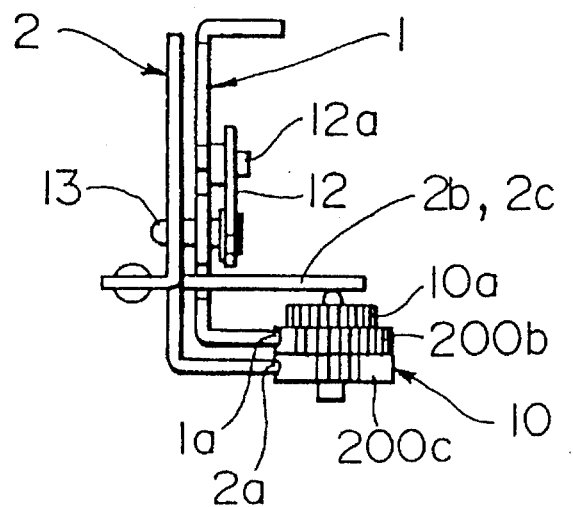
FIG. 29A is an illustration of a modification of a loading guide gear connected with the first and the second loading guide plates.
Figure 29B:
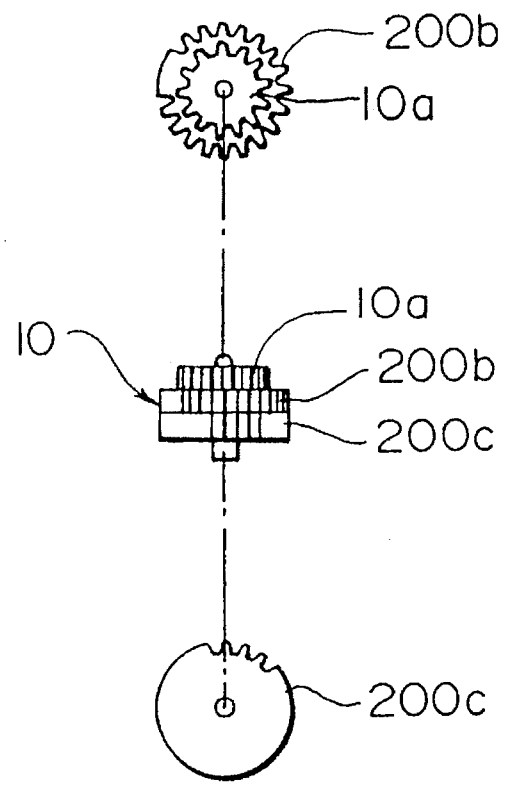
FIG. 29B shows a top, a side and a bottom view of the modified guide gear.

The first output gear and the second output gear of the loading guide gear 10 may be sector gears which have only the teeth engageable with the rack gear 1a and the rack gear 2a only during the operations of the first loading guide plate 1 and the second loading guide plate 2, as shown in FIGS. 29A and 29B. The use of these sector gears 200b and 200c as the first and the second output gears makes it possible to omit the first guide groove 14, second guide groove 16, timing plate 12 and the connecting spring 18. Namely, when such sector gears are used, the rack gears 1a and 2a after disengagement from these sector gears 200b and 200c are made to contact the non-toothed portions of the sector gears 200b and 200c, without meshing with the teeth of the sector gears.

Although the invention has been described through its preferred form, it should be understood that the described embodiment is only illustrative, and various changes and modifications, as well as suitable selection of the shape and sizes of the components, are possible without departing from the scope of the invention.

In addition, the present invention can be applied to various types of disk players using various kinds of recording mediums other than MD, although an MD player using an MD as the recording medium has been specifically described.

The disk player of the present invention may be of any one of the types which perform playback only, recording only and both the playback and recording.

In the described embodiment, the driving motor 8 is provided on the chassis unit A which carries the supporting lock mechanism, both the supporting lock mechanism on the chassis unit A and the loading mechanism provided on the supporting unit F are driven by this driving motor 8, with the power transmission from the driving motor 8 to the loading mechanism cut-off during supporting. The same advantage, however, is obtained when the arrangement is modified such that the driving motor 8 is provided on the supporting unit F and the path of power transmission from the driving motor 8 to the supporting lock mechanism is cut-off by a suitable means during supporting of the supporting unit. Such means for cutting off the power transmission path will be obviously obtained in a well-known manner.

Having described preferred embodiments of the invention with reference to the accompanying drawings, it should be understood that the invention is not limited to those precise embodiments and that various changes and modifications may be effected therein by one skilled in the art without departing from the scope or spirit of the invention.

What is claimed is:

1. An information processing apparatus comprising:

holding means for holding a cartridge member encasing a recording medium in which information to be processed by said apparatus is stored;

conveying means for conveying said cartridge into said holding means;

moving means for moving said holding means along with said cartridge to a predetermined section at which a predetermined processing is performed to said information stored in said recording medium;

supporting means for resiliently supporting said predetermined section;

support locking means for locking said predetermined section;

lock releasing means for releasing said predetermined section from said locked state; and drive power transmitting means for transmitting driving power generated by a drive source to both said conveying means and said lock releasing means, said drive power transmitting means comprising a pair of side plates, said side plates being placed in parallel with each other and movable along a horizontal direction, and each of said side plates including a rack gear respectively engageable with one of first and second gears coaxially rotatable; and said side plates having a pair of contacting portions designed to be contacted and pressed with each other; and a timing plate provided in parallel to said side plates for controlling timings of said horizontal movement of said side plates, and wherein said timing plate includes a pin projected through a first groove formed in one of said side plates and a second groove formed in the other of said side plates, said first and second grooves respectively having cam portions, whereby movement of said side plates are controlled by said timing plate.

2. An information processing apparatus according to claim 1, wherein said processing to be performed to the information is a reproducing operation of a recorded information.

3. An information processing apparatus according to claim 1, wherein said conveying means comprises an arm member swingable in a plane parallel to an upper surface of said holding means, a clamper member slidable along said conveying direction in response to a swinging operation of said arm member, and an engaging portion formed on said clamper member so as to engage with a predetermined portion on said cartridge.

4. An information processing apparatus according to claim 3, further comprising an eject mechanism, and wherein an eject cam portion is formed on one of said pair of side plates and a shape of said eject cam portion controls operation of said eject mechanism.

5. An information processing apparatus according to claim 4, wherein said eject cam portion is formed in said side plate adjacent to said timing plate.

6. An information processing apparatus according to claim 4, wherein said eject mechanism comprises a link member including a cam follower portion movable along said eject cam portion and a connecting member for connecting said link member with said arm member.

7. An information processing apparatus according to claim 6, wherein said arm member and said link member are swingable about a swinging center.

8. An information processing apparatus according to claim 6, wherein said eject cam portion is a groove and said cam follower portion is a pin movable along said groove.

9. An information processing apparatus according to claim 6, wherein said connecting member comprises a spring.

10. An information processing apparatus according to claim 1, wherein said moving means comprises a pin formed on a side surface of said holding means and a holder groove formed in one of said side plates for receiving said pin and extending horizontally with an end portion thereof inclined down so that said holding means moves horizontally first and then vertically.

11. An information processing apparatus according to claim 1, wherein said timing plate is provided at a most inner side of said side plates and said pin is projected outward.

12. An information processing apparatus according to claim 1, wherein said conveying means comprises an arm member and a pair of clamper members both of which have an engaging portion respectively with predetermined portions of said cartridge.

13. An information processing apparatus according to claim 1, wherein said first and second gears comprise sector gears.

* * * * *